(12) United States Patent
Johnson, Jr.

(10) Patent No.: US 6,677,559 B2
(45) Date of Patent: *Jan. 13, 2004

(54) THERMOSET HEATING COMPOSITION INCLUDING HIGH EFFICIENCY HEATING AGENTS AND METHODS OF USE

(76) Inventor: Robert H. Johnson, Jr., 320 E. Main St., Lancaster, OH (US) 43130

( * ) Notice: Subject to any disclaimer, the term of this patent is extended or adjusted under 35 U.S.C. 154(b) by 0 days.

This patent is subject to a terminal disclaimer.

(21) Appl. No.: 10/178,691

(22) Filed: Jun. 24, 2002

(65) Prior Publication Data

US 2003/0057201 A1 Mar. 27, 2003

Related U.S. Application Data

(63) Continuation of application No. 09/667,129, filed on Sep. 21, 2000, now Pat. No. 6,423,953, which is a continuation of application No. 09/489,981, filed on Jan. 21, 2000, now Pat. No. 6,137,093, which is a continuation of application No. 09/032,092, filed on Feb. 27, 1998, now Pat. No. 6,023,054

(60) Provisional application No. 60/039,408, filed on Feb. 28, 1997.

(51) Int. Cl.$^7$ .................................................. H05B 6/10
(52) U.S. Cl. ..................... 219/634; 428/357; 442/132
(58) Field of Search ................... 219/634, 633, 219/632, 643; 428/357, 361, 368; 422/132; 123/272.4

(56) References Cited

U.S. PATENT DOCUMENTS

| | | |
|---|---|---|
| 2,087,480 A | 7/1937 | Pitman |
| 2,393,541 A | 1/1946 | Kohler |
| 2,760,243 A | 8/1956 | Korb |
| 3,391,846 A | 7/1968 | White |
| 3,395,261 A | 7/1968 | Leatherman et al. |
| 3,461,014 A | 8/1969 | James |
| 3,462,336 A | 8/1969 | Leatherman |
| 3,477,961 A | 11/1969 | Castagna |
| 3,507,735 A | 4/1970 | Chisholm |
| 3,528,867 A | 9/1970 | Leatherman et al. |
| 3,574,031 A | 4/1971 | Heller, Jr. et al. |
| 3,620,875 A | 11/1971 | Guglielmo, Sr. |
| 3,620,876 A | 11/1971 | Guglielmo, Sr. |
| 3,657,038 A | 4/1972 | Lightfoot |
| 3,709,775 A | 1/1973 | James |

(List continued on next page.)

OTHER PUBLICATIONS

Database WPI, Section Ch, Week 8826, Derwent Publications Ltd., London, GB; AN88–180172, XP002073393, & JP 63 118 391 (Abstract).

(List continued on next page.)

Primary Examiner—Quang T. Van
(74) Attorney, Agent, or Firm—Stevens & Showalter, LLP

(57) ABSTRACT

Thermoset heating compositions for use in alternating magnetic fields include fiber based heating agents which have remarkably and unexpectedly high heating efficiencies. The fibers operate efficiently at lower field intensities; at lower frequencies and with smaller diameters (related to skin depths) than prior art technologies. The fibers may be formed from a variety of ferromagnetic materials, including, for example: iron, nickel, cobalt, chromium and alloys thereof. The preferred materials group is: carbon steel, magnetic stainless steel, nickel, ferromagnetic coated electrically conductive materials, ferromagnetic coated electrically nonconductive materials. The fibers are sized, in accordance with skin effect theory, to heat effectively at a frequency substantially higher that the actual frequency to be utilized. The fibers have lower apparent density and/or smaller diameters and/or higher surface areas and/or substantially higher heating efficiency than powder of the same ferromagnetic composition for operation at a given frequency.

175 Claims, 10 Drawing Sheets

U.S. PATENT DOCUMENTS

| | | |
|---|---|---|
| 3,730,804 A | 5/1973 | Dickey |
| 3,816,574 A | 6/1974 | Heller, Jr. et al. |
| 3,900,360 A | 8/1975 | Leatherman |
| 3,902,940 A | 9/1975 | Heller, Jr. et al. |
| 3,941,641 A | 3/1976 | Heller, Jr. et al. |
| 3,996,402 A | 12/1976 | Sindt |
| 4,029,837 A | 6/1977 | Leatherman |
| 4,035,547 A | 7/1977 | Heller, Jr. et al. |
| 4,090,899 A | 5/1978 | Reich |
| 4,313,777 A | 2/1982 | Buckley et al. |
| 4,435,465 A | 3/1984 | Ebneth et al. |
| 4,521,659 A | 6/1985 | Buckley et al. |
| 4,626,642 A | 12/1986 | Wang et al. |
| 4,762,864 A | 8/1988 | Goel et al. |
| 4,859,524 A | 8/1989 | Kim et al. |
| 4,871,412 A | 10/1989 | Felix et al. |
| 4,878,978 A | 11/1989 | Goel et al. |
| 4,969,968 A | 11/1990 | Leatherman |
| 5,075,034 A | 12/1991 | Wanthal |
| 5,123,989 A | 6/1992 | Horiishi et al. |
| 5,124,203 A | 6/1992 | Leatherman |
| 5,126,521 A | 6/1992 | McGaffigan |
| 5,129,977 A | 7/1992 | Leatherman |
| 5,240,542 A | 8/1993 | Miller et al. |
| 5,248,864 A | 9/1993 | Kodokian |
| 5,313,034 A | 5/1994 | Grimm et al. |
| 5,338,497 A | 8/1994 | Murray et al. |
| 5,340,428 A | 8/1994 | Kodokian |
| 5,352,517 A | 10/1994 | Clough et al. |
| 5,357,085 A | 10/1994 | Sturman, Jr. |
| 5,378,879 A | 1/1995 | Monovoukas |
| 5,406,055 A | 4/1995 | McGaffigan et al. |
| 5,412,185 A | 5/1995 | Sturman, Jr. et al. |
| 5,447,592 A | 9/1995 | Berce et al. |
| 5,481,091 A | 1/1996 | Grimm et al. |
| 5,483,043 A | 1/1996 | Sturman, Jr. et al. |
| 5,508,496 A | 4/1996 | Hansen et al. |
| 5,529,708 A | 6/1996 | Palmgren et al. |
| 5,538,581 A | 7/1996 | Gallant |
| 5,550,511 A | 8/1996 | Miyashita |
| 5,571,436 A | 11/1996 | Gregg et al. |
| 5,624,594 A | 4/1997 | Matsen et al. |
| 5,641,422 A | 6/1997 | Matsen et al. |
| 5,683,608 A | 11/1997 | Matsen et al. |
| 6,056,844 A * | 5/2000 | Guiles et al. ............ 156/272.4 |
| 6,423,953 B1 * | 7/2002 | Johnson, Jr. ................ 219/634 |

OTHER PUBLICATIONS

Database WPI, Section Ch, Week 8642, Derwent Publications Ltd., Longdon, GB; AN 86–276603 AP002073394, JP 61 203 302 (Abstract).

Database WPI, Section Ch, Week 8913, Derwent Publications Ltd., London, GB; AN 89–096249 XP002073395, JP 01 043 583 A (Abstract).

Database WPI, Section Ch, Week 9321, Derwent Publications Ltd., London, GB; AN93–172287, XP002073396 & JP 05 104 637 A (Abstract).

* cited by examiner

ROUND

RECTANGULAR

FORMED

PANCAKE

SPIRAL-HELICAL

INTERNAL

FIG.11

Table I

The skin depths, based on the values of Monovoukas an Tudbury are as follows:
Skin Depths in microns

| Freq. | Nickel 68°F | Nickel 600°F | Low C Steel/Iron 68°F | Low C Steel/Iron 200°F | Low C Steel/Iron 1000°F | 400 S. Steel 68°F | 400 S. Steel 1000°F | 300 S. Steel 68°F | 300 S. Steel 600°F |
|---|---|---|---|---|---|---|---|---|---|
| 200 KHz | 28 | 61 | 64 | 72 | 138 | 140 | 180 | 968 | 1120 |
| 335 KHz | 23 | 47 | 49 | 56 | 106 | 108 | 138 | 747 | 866 |
| 388 KHz | 21 | 44 | 46 | 52 | 99 | 101 | 129 | 694 | 805 |
| 488 KHz | 19 | 39 | 41 | 46 | 88 | 90 | 115 | 619 | 718 |
| 738 KHz | 15 | 32 | 33 | 38 | 72 | 73 | 93 | 503 | 583 |
| 3.5 MHz | 7 | 15 | 15 | 17 | 33 | 34 | 43 | 231 | 268 |
| 4.0 MHz | 7 | 14 | 14 | 16 | 31 | 31 | 40 | 216 | 251 |
| 5.0 MHz | 6 | 12 | 13 | 14 | 27 | 28 | 36 | 193 | 224 |

FIG. 12

Table II

| Susceptor | 335 ΔOil Sec | 388 ΔOil | 488 ΔOil | 738 ΔOil | 3.5M ΔOil | 4.0M ΔOil | 5.0M ΔOil | 335 | 388 | 488 | 738 | 3.5M | 4.0M | 5.0M |
|---|---|---|---|---|---|---|---|---|---|---|---|---|---|---|
| | 20 | 20 | 20 | 20 | 20 | 20 | 20 | Heating rate as % of heating rate of iron powder 74-420µ | | | | | | |
| Ni Flake 15-20µx1µ | 0 | 0 | 0.4 | 2 | 0 | 2 | 4 | 0% | 0% | 14% | 29% | 0% | 8% | 14% |
| Ni Flake 15-40µx2µ | 0 | 0.4 | 0.4 | 4 | 0 | 2 | 4 | 0% | 25% | 14% | 57% | 0% | 8% | 14% |
| Ni Flake 30x0.4µ | 0 | 0.4 | 0.4 | 5 | 2 | 4 | 4 | 0% | 25% | 14% | 71% | 17% | 17% | 14% |
| Ni Fiber 35x1000µ | 2.4 | 3.6 | 5.6 | 14 | 38 | 48 | 60 | 200% | 225% | 200% | 200% | 317% | 200% | 214% |
| Ni Fiber 35x260µ | 1.2 | 2 | 3.2 | 9 | 20 | 30 | 48 | 100% | 125% | 114% | 129% | 167% | 125% | 171% |
| C steel wool 38x1000µ | 11.2 | 15.6 | 28 | 66 | 106 | 152 | | 933% | 975% | 1000% | 943% | 883% | 633% | |
| C steel wool 45x2000µ | 15.6 | 23.2 | 38.4 | 86 | 108 | 152 | | 1300% | 1450% | 1371% | 1229% | 900% | 633% | |
| Iron powder 74-420µ | 1.2 | 1.6 | 2.8 | 7 | 12 | 24 | 28 | 100% | 100% | 100% | 100% | 100% | 100% | 100% |
| Iron powder 35-150µ | 0.8 | 0.8 | 1.2 | 3 | 6 | 16 | 18 | 67% | 50% | 43% | 43% | 50% | 67% | 64% |
| 300 SS Flake 50-150µ | 0.4 | 0.4 | 0.8 | | 2 | 0 | 2 | 33% | 25% | 29% | | 17% | 0% | 7% |
| 300 SS Fiber 8x4000µ | 2 | | 3.2 | 16 | 20 | 76 | 112 | 167% | | 114% | 229% | 167% | 317% | 400% |
| 300 SS RapS Fb 75x3500µ | 0.4 | 0.4 | 0.4 | 9 | | | | 33% | 25% | 25% | 129% | | | |
| Ni Carbon Fiber 7x6000µ | | | 1.2 | | 120 | 140 | 240 | | | 43% | | 1000% | 583% | 857% |
| 400 SS DnFb 22x3500µ | 9.2 | 12.8 | 22.4 | | | | | 767% | 800% | 800% | | | | |
| 400 SS Wool 45x2000µ | 14 | 20.8 | 37.6 | | | | | 1167% | 1300% | 1343% | | | | |
| 400 SS Wool 45x4000µ | 13.2 | 20 | 33.6 | | | | | 1100% | 1250% | 1200% | | | | |
| 400 SS RapSFb 150x4500µ | 7.2 | 9.6 | 18 | | | | | 600% | 600% | 643% | | | | |

FIG. 13

Table III

| Susceptor | 388 Khz ΔOil, F° 20 sec 6 turn | 488 KHz ΔOil, F° 20 sec 6 turn | 388 Khz Heating rate as % of heating rate of iron powder 74-420μ | 488 KHz |
|---|---|---|---|---|
| Ni Flake 15-40x2μ | 76 | 116 | 380% | 557% |
| Ni Flake 30x0.4μ |  | 108 |  | 386% |
| Ni Flake 15-20x2μ | 36 |  | 180% |  |
| 300 SS Flake 50-150μ |  | 28 |  | 100% |
| Ni Fiber 35x1000μ | 32 | 44 | 160% | 157% |
| Ni Fiber 35x260μ | 12 | 12 | 60% | 43% |
| 300 SS fiber 8x4000μ | 130 | 196 | 650% | 700% |
| Ni Carbon Fiber 7x4000μ | 86 | 116 | 430% | 414% |
| 400 SS Dn Fiber 22x3500μ | 88 | 152 | 440% | 543% |
| 400 SS Wool 45x2000μ | 134 | 188 | 670% | 671% |
| 400 SS Wool 45x4000μ |  | 184 |  | 657% |
| C steel wool 38x1000μ | 118 | 156 | 590% | 557% |
| C steel wool 45x2000μ | 176 | 284 | 880% | 1014% |
| Iron powder 74-420μ | 20 | 28 | 100% | 100% |
| Iron powder 35-150μ | 2 | 8 | 10% | 29% |
| 300 SS RapS Fb 75-3500μ |  | 16 |  | 57% |
| 400 SS RapS Fb 150x4500μ |  | 100 |  | 357% |

FIG. 14

Table IV

| Heating Agent | % Loading by weight | Optimum weld time 5.5 MHz | 64% iron powder weld time as % of optimum weld time | Optimum weld time 3.6 MHz |
|---|---|---|---|---|
| Iron powder 74-420μ | 64% | 22 sec | 100% | No weld |
| C Steel Wool Fiber 38 x 1000μ | 10% | 14 sec | 157% | |
| | 15% | 10 sec | 220% | |
| | 25% | 5 sec | 440% | 25 sec |
| | 35% | 3 sec | 730% | 15 sec |
| | 45% | 2 sec | 1100% | 12 sec |
| S Steel Wool Fiber 45 x 2000μ | 25% | 7 sec | 310% | 40 sec |
| | 35% | 4 sec | 550% | 25 sec |

THERMOSET HEATING COMPOSITION INCLUDING HIGH EFFICIENCY HEATING AGENTS AND METHODS OF USE

CROSS REFERENCE TO RELATED APPLICATIONS

This application is a continuation of U.S. patent application Ser. No. 09/667,129, filed Sep. 21, 2000 now U.S. Pat. No. 6,423,953, which has been allowed, the issue fee paid and is a continuation of U.S. patent application Ser. No. 09/489,981, filed Jan. 21, 2000, now U.S. Pat. No. 6,137,093 which is a continuation of U.S. patent application Ser. No. 09/032,092, filed Feb. 27, 1998, now U.S. Pat. No. 6,023,054, which claims the priority of U.S. Provisional Patent Application No. 60/039,408 filed Feb. 28, 1997. Such specifically enumerated prior applications are hereby incorporated herein by reference.

BACKGROUND OF THE INVENTION

1. Field of the Invention

This invention relates to heating agents that heat in alternating magnetic fields, and more specifically to thermoset heating compositions including fibers that generate unexpectedly high heating rates and do so despite being smaller in diameter than previously thought necessary to generate significant heating.

2. Description of Prior Art

Radio frequency alternating magnetic fields have been used for some time to generate heat in heating agents. The process is related to and uses equipment similar to the induction heating generators used in the heat treating of metals. The heating agents are electrically conductive and/or magnetic. An electrically non-conductive, non-magnetic material or matrix is transparent to a magnetic field in the radio frequency range and therefore cannot be heated by the field. The heating agents are normally added to or placed upon or in materials or matrices that would otherwise not heat or not heat efficiently in an alternating field of a given frequency and intensity (the resulting combinations hereafter termed "heating matrices"). Applications include: bonding or welding of thermoplastics; curing of thermosets; melting or curing of adhesives e.g. thermoplastics, thermosets, thermoplastic/thermosets, elastomerics, etc.; activating foaming agents; initiating polymerization; curing ceramics; generation of heat in containers, inserts or tooling which, in turn, transfer heat to materials in thermal contact therewith; starting or accelerating catalytic reactions; heat sealing, compression and transfer molding and numerous other applications.

The frequencies utilized in practical applications range from: 50 KHz+ for the heating of metal screens; to 2–5 MHz for the heating of ferromagnetic particles e.g. fine iron oxides; to 5–30 MHz for the heating of iron and other ferromagnetic particles. These processes are distinguished from dielectric and microwave heating. Dielectric heating operates in the 27 MHz to high MHz frequency range and generates heat by exciting the electric dipoles in the dielectric material as they try to align with the rapidly alternating electric field. Microwave heating operates at frequencies from the high MHz to the GHz range where water dipoles resonate. Neither the dielectric nor the microwave processes require heating agents in order to generate heat as long as the materials to be heated are sufficiently polar. Heating agents have been added to materials for use in both dielectric and microwave processes, where the heat needed to be concentrated or intensified. The very high frequencies involved allowed the use of very small particles that would not heat as efficiently, if at all, at lower frequencies.

Heat is predominantly generated in heating agents by either hysteresis or eddy current losses. Hysteresis losses occur in any magnetic material. Magnetic dipoles within each magnetic domain of the particle attempt to align themselves with the rapidly alternating magnetic field. The energy required to rotate them is dissipated as heat, the rate at which the heat is generated increases with the rate of reversal of the magnetic field—i.e. the frequency of the alternating current. The hysteresis loop differs for each magnetic material and depends upon the strength of the magnetic field and the properties of the material. The area within the hysteresis loop reflects the magnitude of the hysteresis losses, which are manifested as heat. As long as the particle size is larger than one magnetic domain, hysteresis losses do not depend on particle size. Hysteresis occurs in non-conductive ferrimagnetic materials such as oxides and ferrites as well as ferromagnetic materials.

Eddy currents, as the name implies, are circulating currents that appear to flow in swirls or eddies in electrically conductive materials, which need not be magnetic and thus include copper and aluminum, for example. Eddy currents, like other electrical currents, require a complete electrical path. For a given eddy current there is an associated voltage drop V, which, for a pure resistance R, is given by Ohm's Law, V=IR, where I denotes current. When a voltage drop occurs, electrical energy is converted into thermal energy or heat. Eddy current heating is based on $P=I^2R$, thus the (P) power (heat) in watts is proportional to the square of the (I) current in amps and to the (R) resistance in ohms. Ferromagnetic materials can have both eddy current and hysteresis losses however, if the material is large enough to allow the flow of eddy currents, the heat generated by the eddy currents is generally greater than the heat generated by hysteresis.

Whether a heating agent is large enough to be heated by eddy currents is determined by its size relative to its reference depth. When a solid round bar is placed in a solenoid coil, the alternating current in the coil induces current in the bar. The bar is most easily visualized as consisting of numerous concentric sleeves. The current induced in the outermost sleeve is greater than the current induced in the second sleeve. The effective depth of the current carrying layers is the reference depth or skin depth. The reference depth is dependent on the frequency of the alternating current through the coil, and the electrical resistivity and relative magnetic permeability of the workpiece or heating agent. The definition of d is:

$$d=3160\sqrt{p/\mu f}\text{(English units)}$$

or $$d=5000\sqrt{p/\mu f}\text{(metric units)}$$

Where d is the reference depth, in inches or centimeters; p is the resistivity of the workpiece, in ohm-inches or ohm-centimeters; $\mu$ is the relative magnetic permeability of the workpiece or heating agent (dimensionless); and f is the frequency of the field in the work coil, in hertz. The reference depth is the distance from the surface of the material to the depth where the induced field strength and current are reduced to 1/e, or 37% of their surface value. The power density at this point is $1/e^2$, or 14% of its value at the surface (e=base of the natural logarithm=2.718)

As noted above, the heating efficiency of a heating agent is much higher if it is large enough for eddy currents to flow.

That, in turn is determined by the electrical diameter of the workpiece or heating agent which equals a/d or the ratio of the diameter of the heating agent to the reference depth. A heating agent with a ratio of >4 is efficient at heating, one with a ratio of >2<4 is far less efficient and one with a ratio of <2 is considered "no good" or unusable.

This is the basis for the definition of a "critical frequency" below which induction heating efficiency drops rapidly. Thus for a round bar the critical frequency is that at which the ratio of workpiece diameter to reference depth is approximately 4+/1. Below the critical frequency, efficiency drops rapidly because less current is induced due to current cancellation. Current cancellation becomes significant when the reference depth is such that the eddy currents induced from either side of a workpiece "impinge" upon each other and, being of opposite sign, cancel each other.

The equation for calculating the critical frequency ($f_c$) for a round bar is:

$$f_c = 1.6 \times 10^8 p/\mu a^2 \text{ (a in in.)}$$

$$f_c = 4 \times 10^8 p/\mu a^2 \text{ (a in cm.)}$$

Where a=diameter of the bar; $\mu$=permeability of the material making up the bar and p=resistivity in ohm-inches or ohm-centimeters of the material making up the bar.

Rather than do the calculations each time, the recommend practice in induction heating is to refer to a table or graph to determine the minimum diameters efficiently heated at a given frequency. The following example is from C. A. Tudbury, *Basics of Induction Heating,* John F. Rider Inc., New York, 1960.

3) Power density—As the materials become magnetically saturated the permeability decreases (below the Curie temperature).

The principles of induction heating were well known, with many of the primary texts being written in the 1930's–1950's. The shapes and compositions of the materials that would be used as heating agents were also well known. Heating agents can be conductive, non-conductive, metallic, non-metallic, ferromagnetic or ferrimagnetic. They can come in a range of shapes, for example: powders, particles, oxides, ferrites, flakes, fibers, meshes, screens, braids, foils, sheets (optionally perforated), wire loops or conductive rings. As the technology developed and the practical frequencies rose, induction heating was applied to smaller and smaller parts, particularly to heat treat or join the parts. For example, among the smallest parts that were inductively heated were wires and needles and it is on data generated in this and related areas that calculations regarding particle sizes that were suitable for induction heating were originated. It was known that for a given frequency, a conductive object would not efficiently generate heat if it was less than a specified diameter or size because eddy currents could not flow and therefore it would only generate heat by hysteresis (if it was ferromagnetic).

In the development of heating agents virtually none of the basic shapes or materials were unknown. Patentable heating agents were recognized as distinct species from a much larger genus that, under specified conditions (frequency, coupling, or coil design for example), resulted in advantageous or unexpected results. This distinguished them from the prior art though frequently the distinctions were very fine.

Approximate Smallest Diameter (converted to microns - v) Which Can Be Heated Efficiently By The Equipment Indicated to the Temperature Shown

| Material | Final Temp. ° F. | Motor Generator | | Spark-Gap Oscillator | | Vacuum Tube Oscillator | |
|---|---|---|---|---|---|---|---|
| | | 3 KHz | 10 KHz | 50 KHz | 200 KHz | 450 KHz | 2 MHz |
| Steel | | | | | | | |
| Stress relieve | 1000 | 5,080 | 2,794 | 1,270 | 635 | 432 | 203 |
| Harden | 1600 | 38,100 | 21,590 | 9,652 | 4,826 | 3,175 | 1,524 |

Thus, when making the determination of whether a given heating agent should heat efficiently at a specified frequency one can:
1) calculate the reference depth and divide the particle diameter by the reference depth to determine the electrical diameter of the heating agent; or
2) calculate the critical frequency based on the particle diameter; or
3) refer to a table such as the one above.

As the following factors increase the skin depth decreases, thus decreasing the minimum diameter required for efficient heating.
1) Frequency
2) Permeability As the following factors increase the skin depth increases, thus increasing the minimum diameter required for efficient heating.
1) Resistivity—Thus the material with a higher resistivity has a greater skin depth.
2) Temperature—As the temperature of the material rises the resistivity increases. As the temperature rises the permeability decreases.

For example, consider a group of patents from the genus of conductive ferromagnetic particles. U.S. Pat. No. 2,087,480 to Pitman (1935) specified metal particles or filings which were added to an adhesive and which could be heated in an induction field. The adhesive could be heated (dielectrically) without the conductive particles but the addition of the metal particles allowed the heat to be generated at lower frequencies. In U.S. Pat. No. 2,393,541 to Kohler (1943) it was recognized that iron filings could be rapidly heated in an induction field by both hysteresis and eddy currents but that the iron filings became too hot and degraded the non-magnetic material they were to heat. Therefore Kohler selected ferromagnetic materials that were finely enough divided and insulated from one another by the adhesive or other dielectric material so that they only generated heat by hysteresis and not by eddy currents. When a ferromagnetic material reaches its Curie temperature its permeability drops to 1 and it ceases to generate heat by hysteresis, though it may continue to generate heat by eddy currents. By selecting the ferromagnetic material with the desired Curie temperature and specifying small particle sizes that did not heat by eddy currents, Kohler was able to specify a heating agent that had a maximum temperature below the degradation point of the matrix. In U.S. Pat. No. 3,620,875 to Guglielmo (1971) ferromagnetic particles were specified that were large enough to be heated by both hysteresis and eddy currents to above the Curie temperature.

Examples of other U.S. patents utilizing ferromagnetic particles as heating agents include: U.S. Pat. No. 4,762,864 to Goel (1988); U.S. Pat. No. 3,620,875 to Guglielmo (1971); and U.S. Pat. No. 3,477,961 to Castangna (1969). U.S. Patents with ferromagnetic heating agents limited to their Curie temperature include: U.S. Pat. No. 3,477,961 to Castangna (1969); U.S. Pat. No. 5,378,879 to Monovoukas (1995); and numerous patents to McGaffigan including U.S. Pat. No. 5,126,521 (1992). Examples of metal or conductive screens, meshes or braids are found in U.S. Pat. No. 4,313,777 (1982) and U.S. Pat. No. 4,521,659 (1985) to Buckley; U.S. Pat. No. 5,500,511 (1996) and U.S. Pat. No. 5,508,496 (1996) to Hansen; and U.S. Pat. No. 5,313,034 (1994) and U.S. Pat. No. 5,481,091 (1996) to Grimm. However screens were known to heat in induction field as noted, for example, in U.S. Pat. No. 2,393,541 to Kohler (1943) and U.S. Pat. No. 3,462,336 to Leatherman (1969). Examples of carbon fiber as a heating agent include U.S. Pat. No. 5,248,864 (1993) and U.S. Pat. No. 5,340,428 (1994) to Kodokian and U.S. Pat. No. 4,871,412 (1989) to Felix. Examples of U.S. Patents for heating agents based on hysteresis include: numerous patents assigned to Heller and invented by Heller, Leatherman or James e.g. U.S. Pat. No. 3,461,014 to James (1969) and U.S. Pat. No. 5,129,977 to Leatherman (1992); U.S. Pat. No. 5,123,989 to Horiishi (1992); and U.S. Pat. No. 3,391,846 to White (1968).

There are certain basic principles that apply to the heating of heating agents in a alternating magnetic field. They are useful in evaluating and comparing the results generated by different methodologies for varying heating agents:

1) Increasing the current in an induction coil increases the heating rate. For eddy current heating the power (heat in watts) generated in a given heating agent is proportional to the square of the current induced in the heating agent ($P=I^2R$). Thus if the current in the coil is doubled, the current induced in the heating agent is doubled and the resultant power is 4 times as great. It was assumed that this rapid rise in heating with a rise in power only applied to heating agents heated by eddy currents, because those heated by hysteresis had no current flow. However tests run by Leatherman U.S. Pat. No. 4,969,968 (1990) suggest an even steeper rise in the heating rates of nonconductive submicron iron oxides with the increase in power. However that steep rise was only evident at very high coil currents. Leatherman was uncertain of the reason for this but postulated that it could be that with the increased magnetic field the hysteresis loop became more square, therefore its area increased and accordingly more heat was generated.

2) The closer the coil is to the heating agent the more rapid the heating. The electromagnetic field strength varies inversely with the square of the distance between the coil and the heating agent. Thus if the distance between the coil and the heating agent is doubled the field strength is ¼ as strong, which, in turn, induces ¼ as much current in the heating agent. As noted above, for eddy currents power (heat) is proportional to the square of the current. If the current is reduced to ¼, the power is reduced to ¹⁄₁₆.

3) Higher frequencies tend to lead to more rapid heating of heating agents. In hysteresis heating this is attributable to the greater number of times the dipoles must realign themselves per second and the heat generated with each realignment. In eddy current heating, according to Faraday's law, the voltage or electromagnetic force induced in the heating agent is proportional to the rate at which the field is changing in lines per second. Thus increasing the frequency proportionally increases the voltage induced (which in turn proportionally increases the resultant current). The effects of increased current on power (heat) generated are noted above.

4) The intensity of the magnetic field is multiplied by the number of turns in the coil. The simplest of coils is a single turn coil (FIG. 1.b) in which one lead comes out from the generator, makes a loop or turn and returns to the generator via the other lead. The solenoid coil (FIG. 1.a) is similar to the single turn coil except that it has two or more turns. The product of the current in the coil multiplied by the number of turns (ampere turns) determines the strength of the magnetic field inside the coil. Thus, for a given current a 6 turn coil has 6 times the magnetic field of a single turn coil, induces 6 times as much voltage in the same heating agent, creating eddy currents that are 6 times as strong and, because the heating agent is the same the resistance is the same, therefore the power (heat) generated is 36 times as high ($P=I^2R$).

5) The smaller the coil or the closer the two legs of the coil are the more intense the magnetic field is inside the coil or between the legs. This is due to the proximity effect. If the coil is large or the distance between the legs is large the electrical current is evenly distributed around the copper tubes or other materials that form the coil, as is the magnetic field. As the distance between the coil legs or the coil size decreases the inductance between the portions of the copper tubes which are in proximity with each other decreases, which shifts the current carried by the copper tube in the same manner which, in turn, shifts the magnetic field accordingly. Thus the magnetic field becomes more intense as the coil becomes smaller or the legs of the coil become closer together.

The applications of the alternating magnetic field heating of heating agents fall roughly into two general categories, designated for the purpose of this discussion, S and L.

Category S applications are characterized by some or all of the following features:

1) Coils—small, closely coupled and/or multi-turn coils
2) Substrates—small enough and/or of a configuration that they can be inserted in or surrounded by the coil
3) Concerns—that the heating rate could be too rapid, thereby degrading the matrix In such applications emphasis is placed on heating agents that either heat more slowly or are self-regulating in temperature. This leads to the selection of ferromagnetic, particularly metallic particles, that are small enough in size to either not be heated by or be heated inefficiently by eddy current action and thus rely primarily on hysteresis. Likely candidates would be smaller than, potentially considerably smaller than, 4 reference depths in size. Particles could be selected of a size that was marginally efficient in generating eddy currents at low temperatures and became very inefficient at higher temperatures as the particles' resistivity rose and permeability declined (and thus their skin depth increased).

Alternatively, ferromagnetic or ferrimagnetic heating agents could be selected that had Curie temperatures at or slightly above the desired temperature. These could be nonconductive heating agents such as ferrites, which relied on hysteresis, or conductive heating agents such as alloys with low Curie temperatures. When the Curie temperature is reached the permeability of the heating agent drops dramatically to approximately 1 and the material loses much of its ability to respond to a magnetic field, hence generate heat.

Category L applications are characterized by some or all of the following features:
1) Coils—large, relatively poorly coupled, frequently single turn
2) Substrates—too large and/or of a configuration that they do not lend themselves to being inserted in or surrounded by a Category S type of coil
3) Concerns—that the frequency and/or field intensity of the coil may be too low to generate sufficient heat in the heating agent and generate it rapidly enough to make the application possible or commercially viable In Category L applications for alternating magnetic field heating of heating agents, the rapid and efficient heating of the heating agents is of primary importance and the overheating or too rapid heating of the heating matrix is of less concern. Because the intensity of the magnetic field is frequently much less in these applications it is essential that these heating agents heat as rapidly as possible and efficiently transfer that heat to the materials they are designed to heat. Though most of these heating agents have high Curie temperatures and are capable of generating temperatures that would overheat or degrade the materials around them, their temperature can be regulated by controlling the heating time and/or field intensity.

The present invention is directed primarily toward applications more closely related to those of Category L in which a highly efficient and thus rapidly heating agent capable of quickly and evenly transferring that heat to the appropriate materials would be highly advantageous.

As noted above, in dielectric and microwave heating applications nonconductive, non-magnetic polar materials heat readily at those high frequencies (27 MHz–GHz). Numerous patents have been granted for applications in which the heating needed to be concentrated or intensified. They include Pitman U.S. Pat. No. 2,087,480 (1935) who added fine metal powder or filings to increase the rate of heating of an adhesive that would, without additives, heat dielectrically; seemingly countless patents that have added ferromagnetic or ferrimagnetic particles such as oxides and ferrites to containers and other objects for selective heating in microwave ovens; and patents in which conductive materials were added to adhesives and thermosets for use at microwave frequencies to enhance curing e.g. Wang U.S. Pat. No. 4,626,642 (1986) who found that graphite fibers heated too quickly and that steel and aluminum fibers heated more slowly than graphite but at rates equal to one another.

Metal screens have been used as heating agents in the lower radio frequency range where they relied on eddy currents. Alternatively, they were considered suitable by Kohler U.S. Pat. No. 2,393,541 (1943) at higher frequencies if they were small enough not to be heated by eddy currents and were of a composition with a suitable Curie temperature. Kohler also specified fine ferromagnetic particles (<200–300 mesh or 74–50$\mu$) that were too small to be heated by eddy currents and thus, because they were heated only by hysteresis, would heat only to a selected Curie temperature and therefore not overheat.

Guglielmo U.S. Pat. No. 3,620,875 (1971) specified: ferromagnetic particles 20–200 mesh (841–74$\mu$) in size with the preferred range of 40–100 mesh (420–149$\mu$); 50–66% loading in the heating matrix by weight; and 1–30 Kw generators operating at 5–50 MHz. Heating was predominantly by eddy currents, hence the large particle size and high frequency.

A number of patents (assigned to Heller) have relied on nonconductive, ferromagnetic oxides as heating agents. In the first, James U.S. Pat. No. 3,461,014 (1969) specified magnetic iron oxides sub $\mu$ to 20$\mu$ in size and 5–10 Kw generators operating in the 4–31 MHz frequency range. In Heller & Leatherman U.S. Pat. No. 4,035,547 (1977) the heating matrix had separate heating particles of nonconducting submicron iron oxides that responded to a high frequency magnetic field and agitating particles which were needle like and formed semi-permanent magnets that rotated in response to a second magnetic field in the audio range. The heating particles melted the heating matrix and substrate plastics and the agitating particles were sufficiently stiff to rotate in the audio field and cause an intermixing of the heating matrix and substrate plastics.

In Leatherman U.S. Pat. No. 4,969,968 (1990) the combination of submicron nonconductive iron oxide particles which heat by hysteresis and conductive ferromagnetic particles of at least one micron in size which heat by eddy currents were found to have a synergistic effect, resulting in unexpectedly higher heating rates than would have been predicted by the additive combination. It was noted that the eddy current heating of the conductive ferrous particles required large particles and high frequencies (5–30 MHz) while the submicron nonconductive particles operated in a much lower frequency range of 2–4 MHz. While the eddy current particles do generate some heat at the lower frequencies, it is at a significantly decreased rate and is "uniformly considered as undesirable and impractical". This is due to the skin effect phenomenon which adversely effects the eddy current formation and reduces the generation of heat. This is illustrated in the test tables where at 2.8 MHz a 60% loading of minus 200 mesh (<74$\mu$) iron powder had a heating rate of only 36% of the heating rate generated by a 60% loading of 20–200 (841–74$\mu$) mesh iron powder.

The claimed frequency ranges for the multiple particle agent are: 500 KHz–5 MHz; 1.2–7 MHz; and 3.5–4 MHz. Test data was not included at lower frequencies, however the graphs indicate a marked drop in the heating rates at 2.8 MHz in comparison with 4.5 MHz, particularly at lower coil currents. This suggests that at lower frequencies the heating agent will become inefficient. It was noted that the preferred loading levels of 40% conductive powder and 25% nonconductive particles by weight, had a negative effect on the bonding strength, as would be expected with such a high loading level.

Leatherman indicated that an increase in the coil current increased the heating rate; more gradually for the eddy current responsive powder and more rapidly in the submicron nonconductive particles. "However the design requirements for the coil to make use of high current and frequency levels can be extremely difficult to implement." The tables and graphs indicate that a high coil current is required at both 2.8 MHz and 4.5 MHz to generate any significant heating of the submicron powders. Also of interest is the precipitous decline in the heating rates of all tested heating agents at lower coil currents. The graphs illustrating the relative heating rates of the heating agents indicate that for all the heating agents there is a minimum coil current below which no significant heating occurs. At 4.5 MHz that minimum is 250 coil amps and at 2.8 MHz that minimum is 300 coil amps.

The results observed by Leatherman parallel those of other patentees, the current applicant and industry experience. The results are in accordance with the relevant theories and can be briefly summarized as follows.
1) Larger ferromagnetic particles generate more heat than smaller ferromagnetic particles, particularly at lower frequencies.

2) As the frequency decreases the heating rates of all heating agents decrease significantly, reaching a frequency below which minimal, if any heating is observed.
3) Higher loading levels of heating agents result in higher heating rates but can negatively effect the strength of the bonding agent and the bond.
4) High coil currents are required to generate significant heating rates, particularly at lower frequencies. This is particularly pronounced with non-conductive ferrimagnetic heating agents.
5) As illustrated by the Leatherman tests, a minimum coil current is required to generate any significant heat in any of the heating agents. At 4.5 MHz the minimum is approximately 250 Amps. At 2.8 MHz the minimum is approximately 300 Amps.
6) High frequency and high current coils are increasingly difficult to engineer as the coil length increases, as required for the heating of larger bondlines or substrates.

The Category S applications discussed above include heating agents which are specified to address the concern of heating that is overly rapid or generates too high a temperature. Frequently the heating agents are placed in high intensity fields associated with close coupling and/or multi-turn solenoid coils (FIG. 2 illustrates several multi-turn coils). Numerous patents relate to the welding of plastic pipe, the heating of heat shrinkable thermoplastics and related applications such as cable blocks. By selecting a ferromagnetic or ferrimagnetic material with an appropriately low Curie temperature the heating agent self-regulates to a selected temperature that does not degrade the heating matrix or adjacent materials.

In Monovoukas U.S. Pat. No. 5,378,879 (1995) flake or disk-like ferromagnetic particles with high conductivity and high magnetic permeability were specified. The intent was to provide high efficiency particles that could be loaded into a non-magnetic, non-electrically conductive material or matrix at low loading levels and generate heat rapidly in a controlled fashion. The small size and shape of the particles combined with their low loading levels did not change the desired properties of the article or material. Monovoukas notes that "electrically conductive ferromagnetic particles of a size several times larger than the particle skin depth may be efficient generators of heat by eddy currents. Small skin depth may be achieved with particles of high magnetic permeability and high electrical conductivity exposed to a magnetic field of high frequency." This is in keeping with the principles previously outlined above.

To this end, the preferred material was nickel with a calculated skin depth at 5 MHz of $6.2\mu$ (or nickel alloys) and the preferred configuration was thin flakes because of their high surface area to volume ratio. The percentage loading by volume is preferably between 0.1% and 50%, more preferably between 0.5% and 10% and most preferably about 2%. It is noted that articles loaded above 15% by volume are generally not preferred, and, in fact, are achievable only with particles having relatively lower aspect ratios. Numerous ferromagnetic and ferrimagnetic materials in the logical shapes of flakes, fibers, powders and spheres were loaded at 5% by volume into low density polyethylene and formed into rods 7.9 mm in diameter and 58 mm in length. These were inserted into a 14 turn solenoid coil 11.2 mm in diameter and 73 mm in length, operated at a frequency of 4 MHz with a 30 amperes rms. current. The tests indicated that the high surface area to volume nickel flakes with a major dimension of $30\mu$ (therefore more than 4 limes the calculated skin depth of $7\mu$) heated significantly faster than any other alternative. Other shapes and materials with dimensions several times their skin depth also heated well.

In a patent related to gluing together two non-metallic substrates with a hot polymerizable adhesive Berce U.S. Pat. No. 5,447,592 (1995) stressed "the uselessness, even the disadvantage, of having over rapid heating of the ferromagnetic or ferrimagnetic fillers in a medium that has low thermal conductivity" and that the particles not be overly large such that they overheated and spoiled the medium. To this end small particle sizes (1 $\mu m^3$–100,000 $\mu m^3$) were claimed and much smaller particles (1 $\mu m^3$–1500 $\mu m^3$ or 1000 $\mu m^3$–1500 $\mu m^3$) were preferred in the text. The samples glued in the tests consisted of two substrates 25 mm in width and 3 mm in thickness with a glued area of 25 mm×25 mm and a glue thickness of 2 mm. They were placed in a solenoid induction coil 40 mm in length with six oval spirals or turns 20×30 mm in size, supplied by a 6 Kw generator operating at 200 KHz. The shapes and composition of the heating agent materials paralleled those tested in Monovoukas U.S. Pat. No. 5,378,879 (1995) including magnetite and ferrite spheres and nickel powders and flakes. Given the low frequency (resulting in large skin depths) and small particle size the heating was predominantly due to hysteresis losses.

While the prior art Category L processes for induction heating of matrices via heating agents have found a niche in the market they have numerous short comings which have limited their market acceptance. Solutions to these short comings would greatly increase the market for induction heating of matrices via heating agents and make it possible to produce end products which heretofore have been either impractical or economically unviable, as well as significantly increasing the production rates and profitability of existing applications. Many of the short comings outlined below reflect long felt and well recognized needs in the industry that prior art technologies have been unable to solve or fulfill.

Short Comings of the Prior Technologies Include
1) Long cycle times and/or low production rates. In commercial applications production rates are frequently critical and can determine whether a particular production process and/or in some cases whether the product itself is economically viable. If the induction heating cycle time is too long, another process will be selected. If no other process is viable the product is not viable. This calls for highly efficient heating agents that can heat rapidly and transfer that heat to the matrix and adjacent substrate quickly without degrading either. Faster cycle times can increase the production on existing equipment. More efficient heating agents would allow the use of more than one coil or a multiple station coil (FIG. 1.c) thereby increasing production, particularly if the heating agents maintain their efficiency at the lower frequencies and coil currents associated with longer coils.
2) Inability to overcome poor coupling. With some parts it is not possible to get the coil close to the heating agent or on both sides of the heating agent and as a result either the application is not possible or it is not viable because the field is too weak and therefore the cycle times are too long. For example, this can be due to part geometry and wall thickness. A significantly more efficient heating agent could make previously impossible applications possible and shorten the cycle times sufficiently to make other applications practical.
3) High power input requirements. As noted in the discussion regarding Leatherman U.S. Pat. No. 4,969,968 (1990) because the prior art heating agents are inefficient, particularly at lower frequencies, in many applications it is necessary to use high power generators that are capable of generating sufficient coil current. Such generators are large, expensive and relatively inefficient. A higher efficiency heating agent would eliminate this requirement and make it possible to use smaller, less expensive generators.

4) Required high percentage loadings. Because the prior technologies' heating agents are inefficient generators of heat, their required loading levels are high and this significantly degrades the strength of the heating matrix. More efficient heating agents would require lower loading levels in the matrix and therefore would retain more of the matrix's original strength.

5) Limitations to matrix modifications or enhancements. The high percentage loadings required by the prior art to achieve adequate heating rates, and the attendant loss of strength caused by those high loadings, limit the characteristics of the base matrix and the option of introducing additives to modify or enhance the matrix. For example, in the case of thermoplastics, thermosets and adhesives this limits the ability to utilize higher molecular weight or viscosity materials, due to processing problems. It also limits the ability to introduce additives which could, for example: increase the matrix's tensile strength (carbon, glass or other high strength fiber); conductivity (carbon black, carbon fiber, nickel coated carbon or glass fiber, drawn stainless steel fiber etc.); flame or smoke retardance; and other materials for alternative enhancements. A high efficiency heating agent that required lower loadings would make it possible to utilize these modifications and enhancements.

6) Inability to produce an effectively transparent or colored matrix. The high loading levels of the prior art heating agents make the matrix opaque and give it a distinct color (rusty in the case of ferromagnetic oxide and gray black in the case of ferromagnetic powder). This has proven to be a problem where the substrates are transparent or translucent and therefore the heating matrix is visible. A heating matrix that requires only low loading levels, could produce a matrix that is effectively transparent or easily colored.

7) Localized overheating. Large ferromagnetic powders form hot centers which lead to localized overheating and degradation of the matrix. A more efficient heating agent would transfer heat more quickly and evenly to the matrix, thus eliminating the degradation.

8) Migration of the particles during heating. When the ferromagnetic particles form hot centers they overheat the matrix adjacent to them causing a localized decrease in viscosity and allowing them to rapidly migrate. In some cases they migrate outside the desired area where they can arc to the coil, causing damage to the substrate or the coil. In other cases they tunnel through the substrate, sometimes many millimeters, thereby perforating or contaminating the substrate. A heating agent that did not tend to migrate would minimize these problems.

9) Problems in getting the heating agent into or keeping it in suspension. The ferromagnetic oxide based heating agents are difficult to put into suspension in a liquid or paste without agglomeration. The agglomerations tend to form significant hot spots and uneven strengths. This problem adds to the cost of manufacturing the heating agent. The ferromagnetic powder based heating agents are difficult to keep in suspension because of their high density or more specifically their high apparent density or apparent bulk density. This results in variable loading levels in the heating matrix and difficulty in assuring acceptable heating rates. If the loading level is too high the matrix over heats but if the loading level is too low the matrix does not get hot enough. A heating agent that could be put into suspension and maintained there with relative ease would be highly advantageous.

10) Limited recyclability. The prior art iron oxide or iron powder based heating agents cannot be readily separated from the matrix and therefore contaminate the recycled material. For example, in the case of thermoplastics if a substrate is to be recycled the prior art heating material must be cut out by hand. While this is problematic for recycling at the end of the substrate's useful life it is particularly problematic for the manufacturer who seeks to regrind and reuse substrates not meeting quality standards. Either not recycling the substrate or cutting out the heating agent by hand significantly increases the manufacturer's cost and puts the prior art technologies at a competitive disadvantage compared to alternative technologies that do not require heating agents. Thus a heating agent that could easily be separated from the recycling stream would have distinct competitive advantages, particularly in an increasingly environmentally conscious era.

11) Power input rate limitations. Because the iron powder cannot transfer its heat quickly to the matrix the power input must be limited to minimize matrix degradation. The ability of a more efficient heating agent to rapidly transfer its heat allows the use of higher power, hence faster cycle times, without degradation.

12) Inability to heat high temperature materials adequately. Certain materials such as engineering plastics require high temperatures and high strength welds or joints. Because the prior technologies are inefficient generators of heat they are limited in the temperature they can attain. Adding a higher loading of the prior art heating agent increases the heating rate but significantly degrades the strength of the heating matrix.

13) Inability to generate sufficient heat rapidly enough to selectively heat the matrix adequately before overheating the adjoining conductive substrate. For example, carbon fiber reinforced substrates heat in an alternating magnetic field. Frequently the carbon fiber reinforced substrates are either closer to the coil and/or between the coil and the heating agent. This subjects the substrate to a significantly more intense field than the heating agent. Therefore the heating agent must be highly efficient so that it reaches the required temperature before the substrate overheats and causes distortion, delamination or degradation of the substrate.

14) Limits to coil length. As previously discussed, as coil lengths increase: induction increases and the frequency drops; and resistive losses increase causing a decrease in the coil current. With the inefficient prior technologies these results lead to excessively long cycle times and in some cases the inability to generate adequate heat at all. Numerous potential applications using long coils have not proven possible or practical. With the prior technologies an alternative, in some cases, is to utilize two generators and two coils, thereby increasing the cost and significantly increasing the complexity and difficulty. A highly efficient heating agent could still generate sufficient heat at the lower frequencies and coil currents to make the large coil applications practical and in other cases to eliminate the second generator and coil.

15) Frequency limitations and the resultant inefficient utilization of generator capacity. When the frequency becomes too low the prior technologies become very inefficient generators of heat, frequently to the point that they are too slow or cannot reach a sufficient temperature at all. Not only is the frequency drop a problem for long coils, in many applications it is not possible to tune the generator to provide full output because in doing so the frequency would drop to a point that the prior heating agents do not heat sufficiently. As a result a generator may be tuned to only 50 or 60% of its output, which slows the cycle times and may require a larger, more expensive generator. A heating agent that generated sufficient heat at lower frequencies would make long, poorly coupled coil applications viable. In addition it would allow the generator to be tuned to a higher output, thereby either allowing the use of a smaller, less expensive generator or decreasing the cycle times and increasing the throughput of an existing generator.

16) The necessity of using vacuum tube generators and the inability to use solid state generators. The prior technologies require frequencies in the megahertz range which can only be attained with vacuum tube generators. A high efficiency heating agent that generated adequate heat in the kilohertz frequency range would have industry shaking advantages. It would make it possible to utilize modern, solid state generators which have marked advantages over the vacuum tube generators.

Solid state generators have operating efficiencies approaching 90% in comparison with vacuum tube generators with efficiencies of 50–60%.

The vacuum tube generators inefficiency manifests itself in heat which requires additional cooling capacity.

Additional power is required to compensate for the inefficiency and the added cooling requirements.

Vacuum tube generators are less reliable and require more expensive maintenance.

Solid state generators are a fraction of the size and weight of an equivalent vacuum tube generator. In comparison with a vacuum tube generator system a compact solid state generator system of similar power could be less than 25% of its size and weight while an ultra-compact solid state generator system could be less than 10% of its size and weight.

Such solid state generators could be transportable and hand-held and open up entirely new applications, particularly where in-the-field and hand-held operations are essential.

17) Inability to provide a non-corrosive/non-reactive heating agent with commercially acceptable heating rates. The heating rates for stainless steel powders are significantly lower than the heating rates of iron powder. Increasing the size of the stainless steel powder and/or its loading levels has only helped slightly. There are numerous applications where the use of non-corrosive/non-reactive heating agents would either be highly advantageous or essential, if the heating rates and cost were acceptable.

18) Inability to generate sufficient heat in the heating matrix rapidly enough, to avoid distorting the adjacent substrate. A highly efficient heating agent is capable of bringing the heating matrix and the adjoining surface of the substrate to the required temperature very rapidly before other portions of the substrate are overheated and distorted. Less efficient prior art heating agents, given considerably more time, may ultimately bring the matrix to the required temperature but throughout that extended time heat is migrating through the substrate, leading to its overheating and/or distortion.

SUMMARY OF THE INVENTION

The above short comings of the prior art are addressed by the present invention which comprises a unique class of high efficiency heating agents for use in alternating magnetic fields, thermoset materials heated thereby and the applications thereof. This class of high efficiency heating agents consists of fibers, and in particular, ferromagnetic fibers, which have remarkably and unexpectedly high heating efficiencies that were unrecognized and unpredicted by the prior art, the literature or by industry experience. The fibers operate efficiently at lower field intensities (related to lower coil currents, greater coil coupling distances, longer coils etc.); at lower frequencies (related to longer coils, solid state generators etc.); and with smaller diameters (related to skin depths) than the prior art technologies or than would have been predicted. The high efficiency fibers will make: existing applications faster; previously impractical applications viable; and new applications and the use of new equipment (solid state generators) possible.

While numerous specific embodiments of the invention are disclosed, the heating agent, which is dispersed in, coated upon or otherwise associated with a host material to be heated using the heating agent, may comprise fibers including ferromagnetic material which are sized, in accordance with skin effect theory, to heat effectively at a frequency which is substantially higher that the frequency at which the heating agent can be effectively utilized. That is, the fibers, which would be expected to heat efficiently only at high frequencies in accordance with skin effect theory, the prior art and industry experience, actually heat efficiently at substantially lower frequencies.

The heating agent may be formed from a variety of materials, for example fibers including ferromagnetic material selected from the group consisting of: iron, nickel, cobalt, chromium and alloys thereof; preferably, the fibers can be selected from the group consisting of: carbon steel fibers, magnetic stainless steel fibers, nickel fibers, ferromagnetic coated electrically conductive fibers, ferromagnetic coated electrically nonconductive fibers. The fibers have lower apparent density and/or smaller diameters and/or higher surface areas and/or substantially higher heating efficiencies than powder of the same ferromagnetic composition for operation at a given frequency.

A method in accordance with the present invention may comprise the steps of: providing a heating agent formed as fibers comprising ferromagnetic material; associating the heating agent with a host material; placing the heating agent and host material adjacent to a coil; and, energizing the coil to generate an alternating magnetic field.

The present invention has numerous objects and advantages including:

1) dramatically decreasing cycle times and increasing production rates;
2) coupling more effectively with an alternating magnetic field coil, thereby allowing rapid heating at greater coupling distances or shorter cycle times at equal coupling distances;
3) enabling the use of smaller, less powerful, less expensive generators while producing similar cycle times;
4) requiring significantly lower loading levels in the matrix yet still yielding equivalent or faster cycle times or heating rates;
5) allowing the modification or enhancement of the matrix due to its requiring lower loading levels;
6) allowing the matrix to be effectively transparent or easily colored due to the low loading levels;
7) quickly conducting heat throughout its length, thereby evenly heating the matrix and avoiding localized hot spots and attendant matrix degradation;
8) resisting migration through the matrix and therefore not damaging the matrix or increasing the potential of arcing to the coil;

9) dispersing readily in the matrix and staying in suspension, thereby providing consistent loading levels and the attendant consistent heating rates;

10) being readily removed from the recycling stream with standard equipment and thereby minimizing the difficulty and expense of recycling the substrate, thus decreasing manufacturing waste and cost and increasing the economics and likelihood of recycling the end product;

11) absorbing high power inputs and rapidly transferring the heat without degrading the matrix, thus effectively utilizing its higher efficiency to reduce cycle times;

12) effectively heating high temperature matrices due to its high efficiency and its ability to absorb high power inputs, while transferring the heat to the matrices without degrading them;

13) heating efficiently and rapidly enough to reach the required temperature before the adjacent conductive substrate overheats despite being further from the coil than the substrate;

14) utilizing significantly longer coils, despite their attendant lower frequencies and lower power, thereby efficiently heating larger matrices and substrates that previously could not be heated by other heating agents;

15) heating efficiently at significantly lower frequencies than previously possible, thus allowing the generator to be tuned to full output power even though that results in a lower frequency;

16) allowing the use of highly efficient and compact solid state generators even though they operate in the KHz frequency range instead of the MHz frequency range as required by previous heating agents;

17) being corrosion resistant/non-reactive yet heating nearly as efficiently as its non-corrosion resistant counterparts and far more efficiently than the non-corrosion resistant prior art heating agents; and 18) generating heat rapidly enough to bring the heating matrix and the adjoining substrate to the required temperature before the heat migrates through the substrate thereby causing distortion or degradation.

Further objects and advantages will become apparent from a consideration of the ensuing description and drawings.

BRIEF DESCRIPTION OF THE DRAWINGS

FIG. 11 is Table I which illustrates the skin depths of the primary materials of interest at various frequencies and temperatures.

FIG. 12 is Table II which depicts the results of a selection of the tests done in Example 1.

FIG. 13 is Table III which depicts the results of a selection of the tests done in Example 2.

FIG. 14 is Table IV which depicts the results of a selection of the tests done in Example 3.

DETAILED DESCRIPTION OF THE INVENTION

Figure 1A:
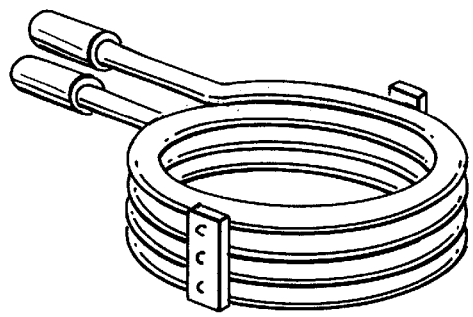
FIGS. 1a to 1d show various types of coils used in induction heating and in the heating of heating agents.
Figure 1B:
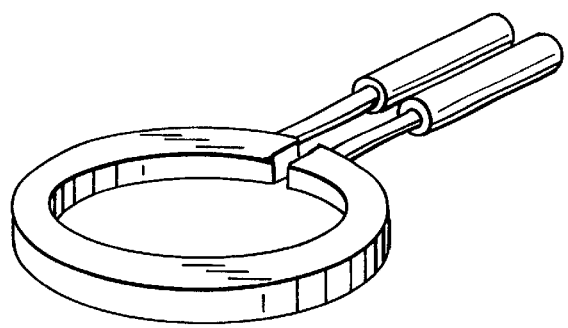
Figure 1C:
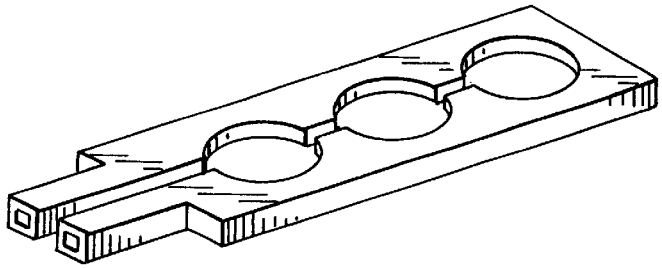
Figure 1D:
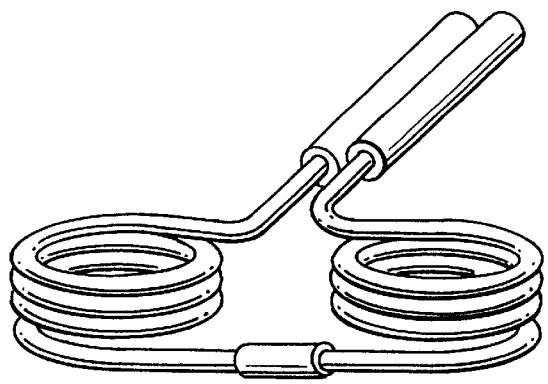

The present invention is directed to a unique class of high efficiency heating agents for use in alternating magnetic fields, the materials heated thereby and the applications thereof. This class of high efficiency heating agents consists of fibers, and preferably, ferromagnetic fibers, which have remarkably and unexpectedly high heating efficiencies that were unrecognized and unpredicted by the prior art, the literature or by industry experience. The fibers operate efficiently at lower field intensities (related to lower coil currents, greater coil coupling distances, longer coils etc.); at lower frequencies (related to longer coils, solid state generators etc.); and with smaller diameters (related to skin depths) than the prior art technologies or than would have been predicted. The high efficiency fibers will make: existing applications faster; previously impractical applications viable; and new applications and the use of new equipment (solid state generators) possible.

In order to establish how unexpectedly and surprisingly high heating efficiencies of the present invention are in comparison with the expectations of the prior art, induction texts and industry experience, a series of tests were performed. A number of heating agents representative of the sizes, shapes and compositions of the prior art were tested and compared with numerous examples of the high efficiency heating agents of the present invention. Sources of supply for all of the tested heating agents are readily found under their respective categories in Thomas Register® which is incorporated herein by reference for all purposes. The tests were performed at a number of frequencies to determine the efficiency of various heating agents both relative to one another at a given frequency and relative to themselves at different frequencies.

To assist in the evaluation of both the expectations and the results four tables are provided.

Table I, the skin depth table, lays out the skin depths of the primary materials of interest at various frequencies and temperatures. The prior art has expended significant effort in discussions regarding the skin depths of the various heating agents, in part because a particle that is large enough in terms of number of skin depths heats by eddy currents which are known to generate significantly more heat than hysteresis heating. Nonconductive ferrimagnetic heating materials heat only by hysteresis. Even if the heating agent is ferromagnetic and conductive, if it is too small in terms of the number of skin depths, it will heat predominantly by hysteresis. Reference to the skin depth table will be made throughout the discussion.

Use of the table:

1) Select the appropriate frequency, composition and temperature
2) Multiply by 2 to determine the minimum particle size that will heat by eddy currents, or 3) Multiply by 4 to determine the minimum particle size that will heat efficiently by eddy currents.

Note: 1) As the temperature rises, the resistivity rises, and the skin depth increases. A particle that is marginally large enough to heat at a low temperature will lose that ability as its temperature rises. Therefore it is recommended to base calculations on a temperature above the temperature the particle is required to reach, taking into consideration that the particle temperature must frequently significantly exceed that of the matrix and substrate which it is heating.
2) The table does not take into consideration that as the temperature rises, the permeability decreases, which in turn increases the skin depth. Nor does the table take into consideration that as the field intensity increases the permeability increases which also increases the skin depth. Therefore the actual skin depth may be understated.

Table II depicts the results of a selection of the tests done in Example 1. In Example 1 a number of heating agents were distributed in a neutral matrix (mineral oil) and placed in a single turn hairpin coil with 2 in or 51 mm between the legs (a more complete description of the tests and procedures will follow). The heating rates at numerous frequencies were determined. The most commercially successful heating agents to date have been ferromagnetic powder, specifically iron powder based. The most efficient of the standard iron powder based heating agents has a particle size of 74–420μ. Given this status the 74–420μ iron powder was selected as the heating agent standard against which all of the other heating agents were compared. The second portion of Table II reflects the heating efficiencies of the other tested heating agents relative to the heating efficiency of the 74–420μ iron powder.

Table III is similar to Table II except that it reflects the results of a selection of the tests done in Example 2. In example 2 a number of heating agents were distributed in mineral oil and placed in the center of a 6 turn solenoid coil with internal dimensions of 32 mm in diameter and 42 mm in length and tested at 388 KHz and 488 KHz (a more complete description of the tests and procedures will follow). In a similar fashion a second portion of Table m reflects the heating efficiencies of the other tested heating agents relative to the heating efficiency of the 74–420μ iron powder.

Table IV depicts the results of a selection of the tests done in Example 3. In Example 3 one of the numerous uses of the high efficiency heating agents was selected as an illustrative example. It was chosen, in part, because more prior art has been directed toward the melting, welding or bonding of thermoplastics than any other use of heating agents. Table IV reflects the optimum welding times of a selection of heating (or welding) matrices at differing % loadings by weight at 5.3 MHz and then compares them relative to fastest standard heating (or welding) matrix in the industry (a 64% loading of 74–420μ iron powder). Table IV also reflects the optimal welding times of the same selection of heating matrices at 3.5 MHz. It was not possible to compare the welding times of the high efficiency heating agent matrices with the fastest standard heating (or welding) matrix in the industry (a 64% loading of 74–420μ iron powder) because the later could not generate sufficient heat under the test conditions to create an adequate bond regardless of the length of time allowed.

EXAMPLE 1

Category L Coil—Hairpin Coil

Test Procedure and Criteria

Figure 3:
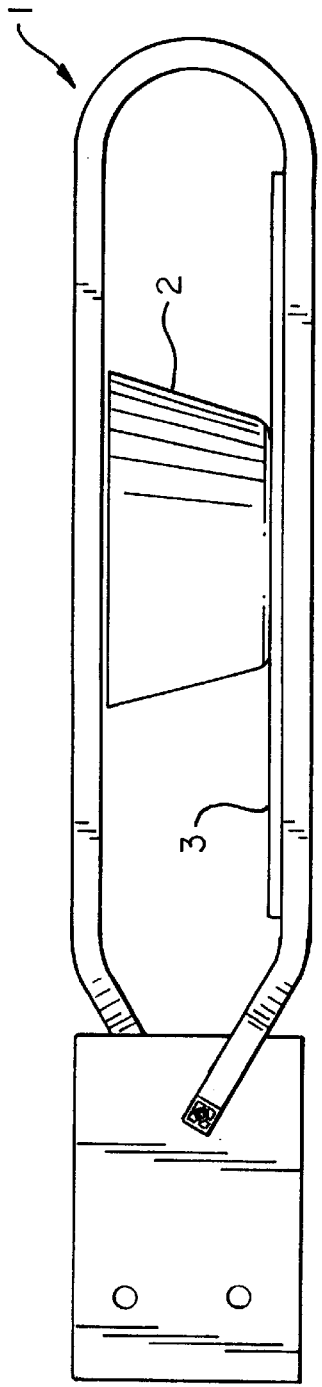
FIG. 3 is a side view of a setup for testing the heating efficiency of heating agents in an oil bath.
Figure 4:
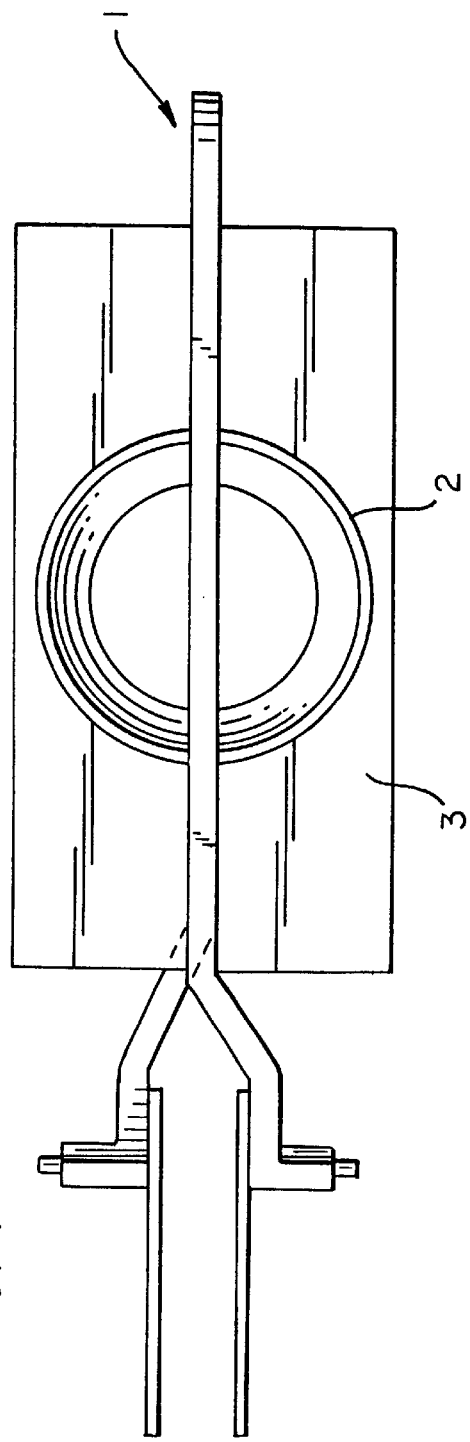
FIG. 4 is a top view of the setup for testing the heating efficiency of heating agents in an oil bath.

A single turn coil of 5/16 in. square copper tubing in the shape of a hairpin (FIG. 3—side view & FIG. 4—top view) 262 mm in length with 51 mm between the legs of the coil (1) was selected as representative of a Category L coil.

Because the intent was to determine the efficiency with which a candidate heating agent generated heat, regardless of the shape of the agent or random variations due to inconsistencies in distribution, mineral oil was selected as the medium to be heated. The oil allowed for rapid equalization of the temperature by stirring and its temperature rise was reflective of the total heat generated. The data generated can be applied to any matrix from solid to liquid and from high density to low.

3 g of heating agent was combined with 60 g of mineral oil and evenly distributed across the bottom of a 150 ml Pyrex® cup (2).

The coupling distance between the heating agent and the coil would, again, need to be representative of a Category L application therefore 6.4 mm was chosen. This included a 3.2 mm thick glass reinforced epoxy sheet (3) between the coil (1) and the Pyrex® cup (2) to eliminate the variable of the coil temperature, either heating or cooling.

Oil temperature measurements were made with digital thermometer probe utilizing a thermistor for the kilohertz range tests and with a K type thermocouple for the megahertz range tests, which were also used to stir the oil and heating agent to transfer the heat from the heating agent to the oil and equalize the temperature of the oil.

Temperature measurements were taken prior to each test and immediately after the tests and the temperature rise calculated.

Test frequencies and coil RF amperes in the kilohertz range were: 335 KHz & 135–145 RFAmps; 388 KHz & 150–160 RFAmps; 488 KHz & 165–175 RFAmps: and 738 KHz & 200–215 RFAmps.

Test frequencies and coil RF amperes in the megahertz range were: 3.5 MHz & 125–135 RFAmps, 4.0 MHz & 130–150 RFAmps; 5.0 MHz & 170–190 RFAmps.

Cycle times were selected for each frequency as a balance between generating measurable heat in the less efficient heating agents but not overheating the more efficient heating agents.

Heating rates were then normalized at 20 seconds for ease of comparison.

Figure 5:
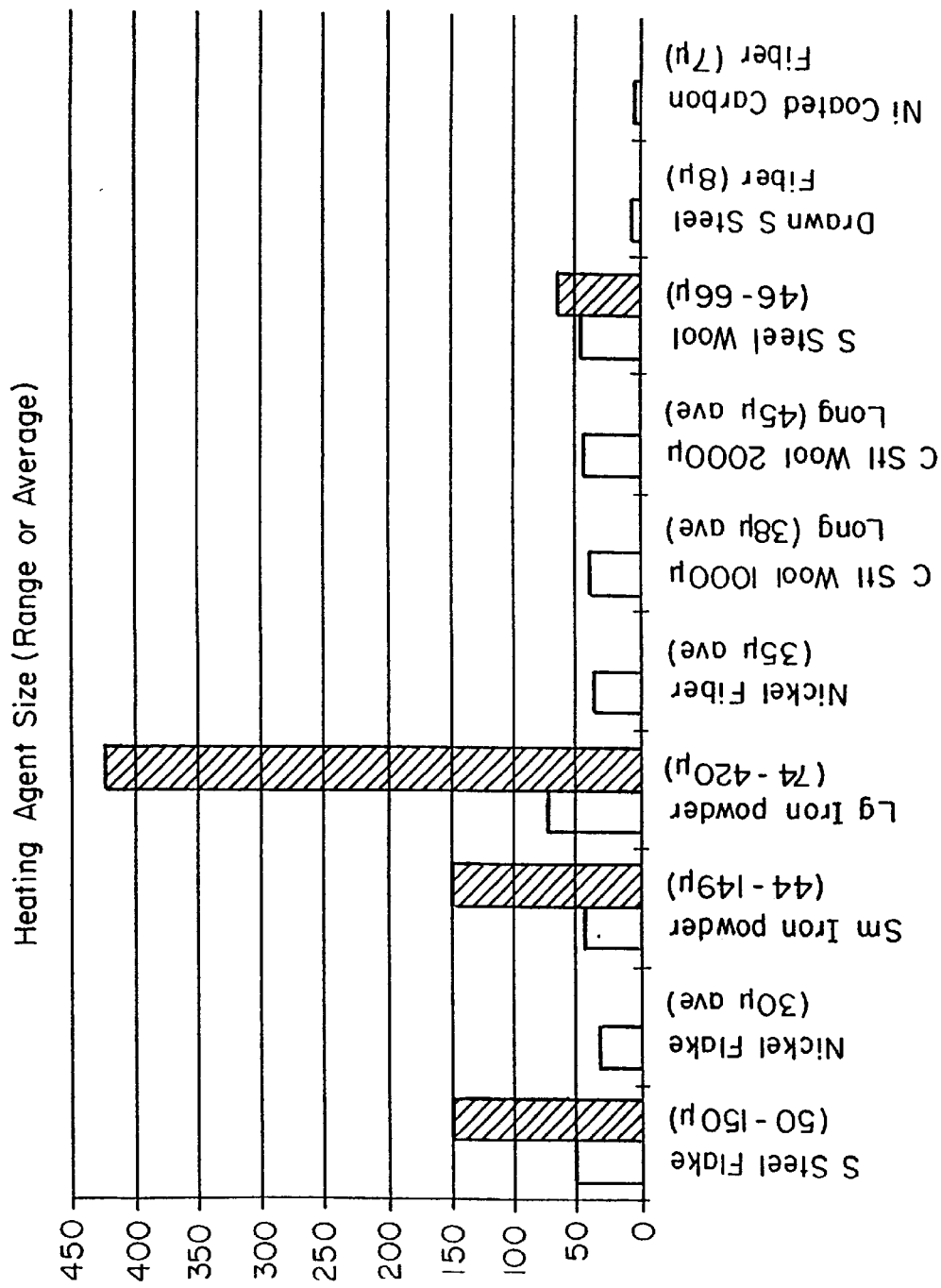
FIG. 5 is a graphical representation of the relative sizes of a selection of the heating agents tested.

Numerous heating agents were tested. (FIG. 5 is a graphical representation of the relative sizes of some of the heating agents). They included: iron powders; nickel and stainless steel flakes; nickel fibers; carbon steel and stainless steel wool fibers; drawn stainless steel fibers; rapidly solidified magnetic (430) and nonmagnetic (316) stainless steel fibers; and nickel coated carbon fibers. Within these types different lengths and/or diameters were tested and compared.

Analysis of the Results of Example 1

Category L Coil—Hairpin Coil

Iron powders As expected the larger iron powder 74–420μ heats more efficiently than the smaller iron powder 35–150μ at all frequencies; and the heating rates of both powders drop significantly between the frequencies of 4.0 and 3.5 MHz. This agrees with both industry experience and the findings of Leatherman U.S. Pat. No. 4,969,968 (1990) and Guglielmo U.S. Pat. No. 3,620,875 (1971). The results are attributable to the skin effect.

In analyzing the iron powders the emphasis will be placed on the larger iron powder 74–420μ as it would be expected to be the more efficient of the two powders, particularly at the lower frequencies. As noted above, the iron powder based heating agents have been the most commercially successful heating agents to date and the larger 74–420µ iron powder, as the most efficient standard heating agent in that line, has been selected as the standard of comparison. The analysis is complicated and inexact because the particle size distribution between screen sizes is not specified. The larger powder is considered a 40–200 (or 420µ–74µ) mesh. The actual size distribution of the tested powder is: 4%<74µ; 25%=74µ–177µ; 45%=177 –250µ; 25%=250–420µ

There are two approaches to analysis of a heating agent by skin depth. The first is to utilize Table I which lists the skin depths for iron at the test frequencies for differing temperatures. Given the complexity associated with the particle size distribution for the 74–420µ iron powder an alternative method is to calculate the critical frequencies for each of the diameters at relevant temperatures.

| The critical frequencies for iron are: | | | |
|---|---|---|---|
| Diameter | 68° F. | 200° F. | 1000° F. |
| 420µ | 59 KHz | 81 KHz | 367 Khz |
| 250µ | 163 KHz | 224 Khz | 1 MHz |
| 177µ | 326 KHz | 447 Khz | 2 Mhz |
| 74µ | 1.9 MHz | 2.6 MHz | 11.6 Mhz |

According to the critical frequency calculations, the iron powders should heat more efficiently at lower frequencies than they do. For example 70% of the particles are larger than 177µ therefore at 200° F. it would be expected that the 74–420µ iron powder would heat efficiently in the mid to low KHz range and even at 1000° F. it would be expected that the 74–420µ iron powder would heat efficiently in the 2 MHz to mid KHz range. However industry experience, the Guglielmo patent (U.S. Pat. No. 3,620,875), the present tests and the Leatherman (U.S. Pat. No. 4,969,968) tests have shown that the heating efficiency of 20–200 mesh iron powder drops rapidly with frequencies below 4–5 MHz.

Nickel flakes

All of the nickel flakes are relatively inefficient heating agents, particularly at the lower frequencies. This is highly surprising given that both Monovoukas U.S. Pat. No. 5,378,879 (1995) and Berce U.S. Pat. No. 5,447,592 (1995) found nickel flakes to be highly efficient.

Monovoukas found that a 30×0.4µ nickel flake, comparable to the 30×0.4µ nickel flake in the current tests, was more efficient than any other heating agent tested including flakes, powders, fibers and spheres of numerous compositions and sizes. Monovoukas attributed this to the 30×0.4µ nickel flake having a diameter several times the skin depth, which he calculated as 7µ, combined with a small thickness (0.4µ) that resulted in a high surface to volume ratio. As the skin depth table, Table I, indicates Monovoukas appears to have only calculated the skin depth at an unrealistic 68° F. As the 30×0.4µ nickel flake heated the skin depth would increase. At 600° F. the skin depth would be 15µ and the diameter would only be two times the skin depth, the theoretical minimum for eddy current heating. This still does not explain why Monovoukas observed rapid heating of the 30×0.4µ nickel flake at 4 MHz while it did not heat efficiently at 4 MHz or even 5 MHz in the current tests.

It is also unexpected that the other nickel flakes in the current tests (15–20×1µ and 15 –40×2µ) are nearly as efficient as the 30×0.4µ nickel flake given that Monovoukas found similar flakes only a fraction as efficient as the 30×0.4µ nickel flake.

The inefficiency of the 30×0.4µ nickel flakes in the current tests is even more surprising given that Berce found that even smaller flakes (25×0.4µ) generated heat efficiently at 200 KHz. Referring once again to the skin depth table (Table I) even at an unrealistic 68° F. the 25×0.4µ nickel flake is less than one skin depth in diameter. At 600° F. it is considerably less than one half of a skin depth in diameter. This indicates that the 25×0.4µ flake is too small to be heated by eddy currents and that therefore the heating must be by hysteresis. Even the largest diameter nickel flake (15–40×2µ) generated negligible heat in the KHz range.

As the comparative portion of Table II indicates, none of the nickel flakes of the current tests generated more than a small fraction of the heat of the larger 74–420µ iron powder. Even the smaller 35–150µ iron powder generated considerably more heat than any of the nickel flakes. This is contrary to Monovoukas's findings in which none of the ferromagnetic powders or spheres, including 120µ nickel or Alnico spheres, generated more than a fraction of the heat of any of the flakes including nickel, stainless steel and other ferromagnetic flakes.

Nonmagnetic 316 Stainless Steel Flakes

Given the large reference depth (see Table I) of nonmagnetic stainless steel it is not surprising that the 50–150×1.2µ 316 stainless steel flake did not heat efficiently in the current tests. What is surprising is that Monovoukas found that similar flakes (75×1.21µ) heated very efficiently.

Nickel Fibers

It is very unexpected that the 35×1000µ and the 35×260µ nickel fibers of the current tests heat much more efficiently than any of the nickel flakes including the 30×0.4µ nickel flakes. The fibers that Monovoukas tested (60×1000µ and 50×500µ) were nearly twice the diameter of the 30×0.41µ nickel flakes but still heated more slowly than the flakes. Monovoukas attributed the fibers rapid heating to their diameters being several times the skin depth, thereby making up for their very low surface to volume ratio. The nickel fibers of the current tests are approximately the same diameter as the nickel flakes. Therefore, based on Monovoukas it was expected that they would heat much more slowly than the nickel flakes given their considerably lower surface to volume ratio.

It is surprising that the 35×1000µ and the 35×260µ nickel fibers heat efficiently in the MHz range and very surprising that they heat at all in the KHz range. As noted in the discussion regarding the 30×0.4µ nickel flakes, even at unrealistically low temperature, the skin depth to diameter ratio of the fibers is marginal at 4 MHz. At lower frequencies the 35µ diameter nickel fibers should not be able to heat by eddy currents yet they still generate significant heat.

Monovoukas tested two nickel fibers 1000µ and 500µ in length and found that they heated at essentially the same rate. Therefore it is unexpected that the longer 1000µ nickel fibers in the current tests heat significantly more than the 260µ long nickel fibers. Another unexpected result is that the difference in heating rates between the identical diameter (35µ) nickel fibers increases as the frequencies decrease.

In comparing the nickel fibers with the much larger diameter iron powders it was expected that the iron powders would heat much more efficiently than the smaller diameter nickel fibers. The tests reveal just the opposite. The 260µ fibers had higher heating rates at all of the frequencies than even most efficient iron powder (74–420µ) except at 335 KHz where they were equal. This was despite the fact that the iron powder was 200% –1200% larger in diameter. The contrast between the 1000µ nickel fiber and the iron powders is even more striking. The 1000µ nickel fiber had heating rates that were 200% –317% of the heating rates of the most efficient iron powder.

8μ 300 series (nonmagnetic) stainless steel fibers

Berce tested one fiber, an 8×2000μ stainless steel fiber by Bekaert®. Though the series of stainless steel was not specified by Berce, Bekaert® only makes the 8μ fiber in 300 series stainless and cannot manufacture a magnetic (400 series) stainless steel fiber in that fine a diameter. According to Bekaert®, due to work hardening, the 8μ 300 series fiber develops "paramagnetic" characteristics which disappear as the fiber is heated during annealing. Referring to the skin depth table (Table I) note that the reference depth for nonmagnetic 300 series stainless steel is many times that of magnetic 400 series stainless steel. In either case it is clear that the 8μ stainless steel fiber is much too small in diameter to have significant eddy current heating, therefore the heating is due to hysteresis.

Berce reported significant heating of the 8×2000μ stainless steel fiber at 200 KHz. In contrast only marginal heating was observed in KHz range of the current tests. In the current tests an 8×4000μ stainless steel fiber from Bekaert® was tested. As noted with the 260μ and 1000μ long nickel fibers, fiber length can have a significant effect on the heating efficiency. This was verified in the results from the other fibers in the current tests. Accordingly, the results in the current tests are not directly comparable with those in Berce. The heating rates of the 4000μ long fibers in the current tests are likely to be significantly higher than the results that would be expected from the 2000μ long fibers of Berce. The 2000μ length is the maximum length an 8μ fiber can be and meet Berce's criteria of <100,000μ$^3$.

The low heating rates of the 8×4000μ fiber are also likely to be inflated because the fibers very low apparent density or apparent bulk density means that 3 grams of the small diameter 8μ fiber entirely filled the Pyrex® cup. This resulted in a situation in which, unlike all of the other tested heating agents except the nickel coated fibers, the space between the two legs of the coil was filled with heating agent. In these two cases the heating agent was effectively coupled by and heated by both legs of the coil.

As the frequency rises into the high KHz range and into the MHz range the heating efficiency of the 8×4000μ fiber increases significantly both in real terms and in comparison with the 74–420μ iron powder. Why this unexpected result occurs is unknown. The diameter of the fiber is still only a small percentage of 1 skin depth, let alone the 4 skin depths required for efficient heating. The much larger diameter iron powders are at their most efficient in the 4 MHz and 5 MHz range yet the 8×4000μ nonmagnetic stainless steel fiber has heating rates that are 317% and 400% that of the iron powder in the 4 MHz and 5 MHz frequencies respectively. Rapidly solidified 300 series 75μ×3500μ stainless steel fiber The 300 series stainless steel fiber is nearly 10 times the diameter of the 8×4000μ stainless steel fiber yet it still heats inefficiently, even less efficiently than the 8×4000μ fiber. This tends to confirm that the effects of the fiber length and low apparent bulk density on the heating rates of the 8×4000μ fiber and why the heating rates of the 8×4000μ fiber are likely be significantly higher than the heating rates that would be expected in the 8×2000μ fiber of Berce.

7μ Nickel coated carbon fibers

It was expected that the 7×6000μ nickel coated carbon fibers would heat less efficiently than the 35×1000μ and 35×260μ nickel fibers, due to their much smaller diameter. At all of the test frequencies and temperatures its diameter is less than one half of the minimum required for eddy current heating (see Table I). The nickel coated carbon fiber's low heating rates in the lower KHz range conformed to expectations.

Given the above observations, what was entirely unexpected was the remarkably high efficiency of the nickel coated carbon fibers in the MHz frequency range. The nickel coated carbon fibers had heating efficiencies 300% to 500% that of the most efficient 35×1000μ nickel fiber. The nickel coated carbon fiber's heating efficiency was approximately 600% to 1000% that of the most efficient 74–420μ iron powder, even though the iron powder was 1100% to 5700% larger in diameter.

22×3500μ 400 series drawn stainless steel fiber

Based on the skin depth of 400 series stainless steel (see Table I) it would be expected that a 22μ diameter 400 series stainless steel fiber would not heat efficiently at any of the test frequencies because it would be too small to be heated by eddy currents. Even at the highest frequency, 5 MHz and an unrealistically low temperature of 68° F. 22μ is less than ½ the minimum two times the skin depth (28×2=56μ). Contrary to expectations it heats very efficiently even in the KHz range.

Because the nickel fibers are larger in diameter (35μ) and because nickel has a much smaller skin depth it would be expected that the nickel fibers would heat much faster than the 22μ diameter 400 series stainless steel fibers. Surprisingly the opposite is true. For example at 488 KHz the 22×3500μ 400 series drawn stainless steel fiber has a heating rate 400% that of the 35×1000μ nickel fiber and 700% that of the 35×260μ nickel fiber.

The comparison with the much larger 74–420μ iron powder is even more dramatic. For example at 488 KHz the 22×3500μ magnetic stainless steel fiber has a heating rate 800% that of the iron powder. The iron powder has a much smaller skin depth and a much larger diameter than the 22×3500μ magnetic stainless steel fiber, therefore it would be expected that the iron powder would be much more efficient, not the stark opposite.

45×2000μ and 45×4000μ 400 series stainless steel wool fibers

Again, based on the skin depth of 400 series stainless steel it was not expected that the 45×2000μ 400 series stainless steel fibers would heat efficiently at any of the test frequencies. Remarkably, not only did they heat exceptionally efficiently they did so in the KHz range.

The comparison with the 74–420μ iron powder is dramatic. It is even more dramatic when it is recalled that industry experience with stainless steel powder has been that the stainless steel powder is significantly less efficient than the equivalent sized iron powder. The industry experience correlates with the relative skin depths of iron and stainless steel. Even when the stainless steel particles were larger their heating efficiencies were not as high as the iron powder. Many applications for noncorrosive/nonreactive heating agents were not viable because of the inefficiency of the stainless steel powder. The high heating efficiency of the fibers of the present invention will reverse that situation.

It is interesting to note that the 2000μ long 400 series stainless steel fibers are actually slightly more efficient than their 4000μ long counterpart. This contrasts with the 260μ vs. the 1000μ long nickel fibers, where the longer fibers are distinctly more efficient and that efficiency gap increases as the frequency decreases. This suggests that for a given frequency increasing the fiber length increases the efficiency but only to a point. Beyond that point longer fibers may not be more efficient. This has application in specifying the optimum fiber length for specific frequencies and conditions.

150×4500μ rapidly solidified 400 series stainless steel fibers

It was expected that the much larger diameter 150×4500μ rapidly solidified 400 series stainless steel fibers would heat significantly more efficiently than the other 400 series stainless steel fibers with diameters of 22µ and 45µ. The reverse was found. While the larger diameter (150µ) fibers heated efficiently they were less efficient than the other 400 series stainless steel fibers.

38×1000µ carbon steel wool fibers

Because iron and low carbon steel have similar skin depths and the 38µ diameter is so much smaller than the 74–420µ iron powder it was expected that the iron powder would be much more efficient. Once again the reverse is true. The 600%–1000% advantage of the 38×1000µ carbon steel wool fibers will have a significant impact on the industry.

Also surprising is that the 38×1000µ carbon steel wool fibers are so much more efficient than the similar sized 35×1000µ nickel fibers. Because nickel has a skin depth of approximately ½ that of the low carbon steel the nickel fibers would be expected to heat much more efficiently.

45×2000µ carbon steel wool fibers

The slight difference in fiber diameter between the 38×1000µ carbon steel wool fibers and the 45×2000µ carbon steel wool fibers should not make a significant difference in the heating rate given that in neither case would the fibers be considered efficient based on skin depths. The 600% to 1450% heating advantage that the 45×2000µ carbon steel wool fibers have over the 74–420µ iron powder will have an even more dramatic impact on the industry.

Fiber length however has been shown to make a significant difference in other examples. The same pattern can be seen in the above comparison. In the MHz range there is little difference in heating rate between the two fibers. As the frequency decreases the gap in heating rates increases with the 2000µ long fiber becoming considerably more efficient.

Note that the efficiency of the 45×2000µ carbon steel wool fibers is only slightly more than that of the 45×2000µ 400 series stainless steel wool fibers in the KHz range. That a stainless steel fiber would be only slightly less efficient than a similar sized carbon steel fiber is remarkable and counter to what would have been predicted.

Additional results and observations based on related tests

Numerous other tests were preformed under similar conditions. In the interest of brevity the results and observations regarding them are summarized below.

Effect of fiber diameter

The prior art, the literature and industry experience indicate that larger diameter heating agents heat more rapidly and heat at lower frequencies than smaller diameter heating agents. This includes the above cited: tests on iron powder done by Leatherman and tests done by the applicant; and the skin depth and critical frequency calculations. Numerous fiber diameters of carbon steel wool fiber were tested ranging from 15µ to 150µ in diameter. All of these diameters are smaller than the 203µ diameter which Tudbury found was the "Approximate smallest diameter which can be heated efficiently" at 2 MHz (see the table with the same name in the Background—Prior Art of this application). All of the fiber diameters were smaller than the larger particles in the 35–150µ (sieve size) iron powder which was widely recognized in the industry to heat slowly even at 5 MHz and was used only in those cases when the standard 74–420µ iron powder was too hot (small and/or closely coupled single turn coils). Yet all of the fibers heated far more efficiently than either of the iron powders.

Surprisingly it was found that fiber diameter was not critical in determining the heating efficiencies of the fibers. The variance in the heating efficiencies from the smallest diameter 15µ fiber to the largest diameter 150µ fiber was less than 50%. It is uncertain how much of the variance is due to fiber diameter and how much is due to the fact that it is easier to cut larger diameter (hence stiffer) fibers without curling or otherwise distorting them or due to variances in fiber length. As was noted above, the 150×4500µ rapidly solidified 400 series stainless steel fiber heated efficiently but less efficiently than any of the other 400 series stainless steel fibers that were smaller in diameter but longer in length and with a lower apparent density.

Effect of fiber length

It was expected that fiber length would not be a factor in determining heating efficiency. The tests suggest the opposite. As discussed above it appears that for a given fiber diameter, composition and frequency; increasing fiber length increases the heating efficiency but only to a point, above which further increasing fiber length appears to marginal additional effects on the heating efficiency. The converse follows that for a given fiber diameter and composition fiber length can be decreased to a point without significant effects on the heating efficiency, but that if fiber length is decreased further heating efficiency will tend to decline. Nothing in the literature or prior art that the inventor is aware of predicts or explains this phenomenon. It is, however, important in the specification of fiber lengths for applications in which high efficiency heating agents are critical.

Effect of fiber to fiber conductivity

It was postulated that perhaps the remarkably high efficiency of the fibers was attributable to fiber to fiber contact providing a pathway for the current to circulate even though the fibers were too small, individually, to generate eddy currents. To test this theory the 38µ×1000µ fibers were treated in a rapidly agitated phosphoric acid bath to form a continuous, nonconductive oxide coating on each of the individual fibers. The phosphated fibers were then subjected to the same tests and the results compared to the identical non-phosphated fiber. There was no significant difference in the heating rates of the phosphated and the non-phosphated 38µ×1000µ carbon steel wool fibers in either the kilohertz or megahertz frequency ranges, thus discounting that possible explanation.

This explanation is further discounted by tests in Example 3, below. Carbon steel wool fiber 35×1000µ in size was added to high density polyethylene at a loading of 10% by weight, forming a heating matrix. Polyethylene is an excellent insulator and it completely surrounded and separated the individual fibers. There were so few fibers in the matrix that the matrix was essentially transparent. This suggests that there was little, if any fiber to fiber contact. None the less the matrix with a 10% loading of the fibers heated remarkably efficiently, generating heating rates that were more than 150% the heating rates of the fastest standard heating matrix in the industry, a matrix with a 64% loading of 74–420µ iron powder.

Continuous unidirectional fibers

Based on numerous patents relating to the heating of carbon fibers it was expected that unidirectional fibers that were too small individually to be heated by eddy currents would not heat in a alternating magnetic field. This was attributed to lack of a closed loop for eddy current flow. Only when the unidirectional fibers were cross-lapped to form a quasi-isotropic mat was the matrix effectively heated. At that point the fibers were effectively forming a mesh or screen which is well known to heat efficiently.

In the present tests 50 mm long lengths of carbon steel wool, consisting of essentially unidirectional fibers were prepared and tested in the same manner as the other samples.

Unexpectedly, in tests in the KHz range they were found to heat very efficiently.

Fiber orientation to the magnetic field

In numerous tests on carbon fibers it was found that when the fibers were predominantly parallel with the lines of magnetic force that they did not heat efficiently but when they were orthogonal or normal to the magnetic field they heated more efficiently. In the test set up of Example 1 (FIGS. 3 & 4) the magnetic field generated around each leg of the hairpin coil (1) resembles the field depicted in FIG. 7. The magnetic field is normal or perpendicular to the coil. Thus unidirectional fibers in the Pyrex cup (2) that were orientated parallel to the coil (1) would be predominantly normal to the field, and therefore would be expected to heat more efficiently. Conversely unidirectional fibers in the Pyrex cup (2) that were orientated perpendicular to the coil (1) would be predominantly parallel to the field, and therefore would be expected to heat considerably less efficiently.

Contrary to expectations the unidirectional fibers which were orientated perpendicular to the coil, thus predominantly parallel to the field, heated very efficiently. Even more unexpectedly they heated more efficiently than the unidirectional fibers which were orientated parallel to the coil, thus predominantly normal or perpendicular to the field.

Example 2

Category S Coil—Solenoid Coil

In the Background—Description of the Prior Art a distinction was made between two general categories of applications of the alternating magnetic field heating of heating agents, Category S applications and Category L applications.

It was also indicated that the patents of Monovoukas U.S. Pat. No. 5,378,879 (1995) and Berce U.S. Pat. No. 5,447,592 (1995) were directed to applications of, or tested in coils falling into, the Category S class. As discussed in the analysis of the results of tests in Example 1, the heating efficiencies found in the Example 1 tests were in many instances dramatically the opposite of those found in Monovoukas and Berce. This suggests that the results and conclusions of Monovoukas and Berce, while accurate for Category S applications, do not hold true for Category L applications. Moreover it suggests that the test setups and methodologies of Monovoukas and Berce masked the far higher efficiencies of the species of fibers to which this application is directed. Neither Monovoukas nor Berce had reason to recognize the unexpectedly high efficiency of the species of fibers to which this application is directed. In many cases they could not have recognized it.

Figure 6:
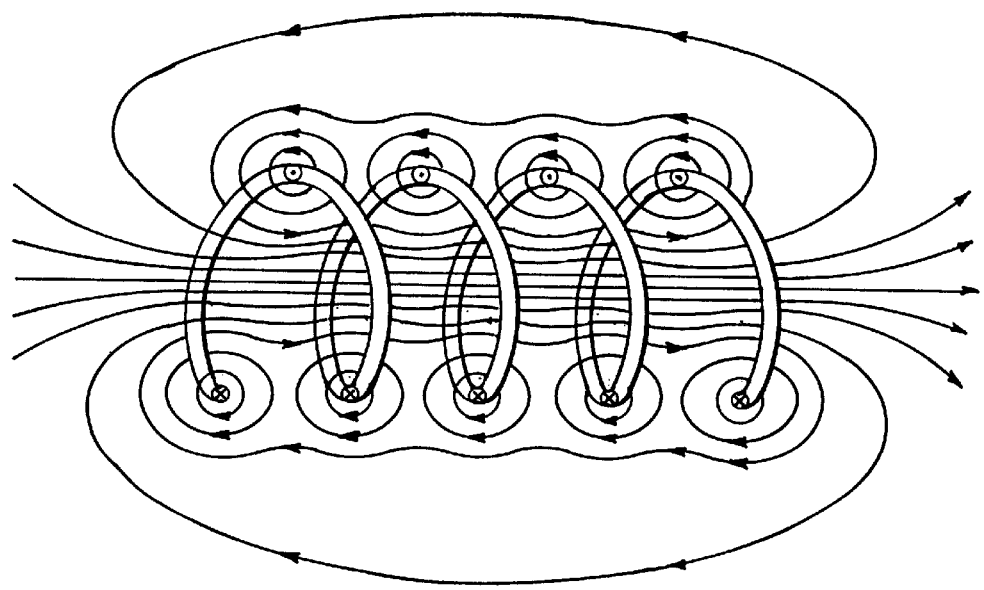
FIG. 6 illustrates the magnetic field generated by a solenoid coil.

Both Monovoukas and Berce use closely coupled solenoid coils which generate high intensity magnetic fields (Category S applications). Not only does each turn of the solenoid coil multiply the magnetic field but the shape and size of the solenoid are critical. In a solenoid coil (FIG. 6) essentially all of the magnetic lines of force must circulate through the center of the solenoid coil. A similar number of lines are generated in a 2 in. (51 mm) diameter solenoid as in a ½ in. (13 mm) diameter solenoid (with the same coil current and number of turns). However, in the smaller solenoid the lines of force are constrained to a much smaller area. Therefore a similar sized heating matrix placed in the smaller coil would have more lines of force intersecting it, both because of the higher density of lines of force and because it would be more closely coupled on all sides by the coil (recalling that the field intensity varies inversely with the square of the distance between the heating agent and the coil). According to Faraday's law, the voltage induced (therefore the current induced in the same heating agent) is proportional to the number of lines of force that intersect the heating agent.

Figure 7:
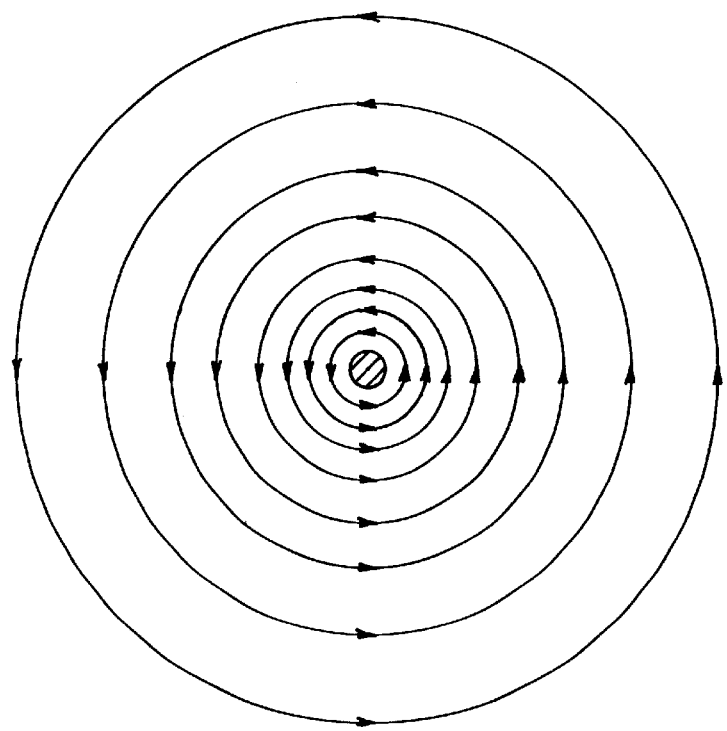
FIG. 7 illustrates the magnetic field generated by a conductor or coil not in proximity with other portions of the coil.

In the applications to which this invention is directed (Category L applications) there is a great need for high efficiency heating agents because the coil shapes, lengths and coupling distances do not result in as intense fields as those found in small closely coupled solenoid coils. In many of the coils for these applications, like the hairpin coil of the present tests, the field radiates approximately equally in all directions (FIG. 7). In the present tests, as in actual applications, because the coupling distance between the coil and the heating matrix is large, the field is less intense. Unlike in a solenoid coil, in a hairpin coil the heating matrix receives most of its field from a small portion of one side of the coil. This is because the rest of the coil on that one side is at an increasing distance from the heating matrix and the other side of the coil is farther away still. Also, unlike a closely coupled solenoid coil, in a less closely coupled hairpin coil a significant portion of the lines of force don't intersect the heating matrix. They flow between the coil and the heating matrix and in concentric circles beyond the heating matrix. Thus in the types of coils used in the applications to which this invention is directed, a given coil current cannot be directly compared to a similar coil current in a smaller, even single turn coil (let alone a small, closely coupled solenoid coil), because fewer of the lines of force it generates actually intersect the heating matrix.

This suggests that the very intense fields in the closely coupled solenoid coils of Monovoukas and Berce obscured the surprisingly higher efficiency of fibers, and in particular magnetic fibers, as discovered in the present invention. The much higher efficiency of such fibers was not apparent in Monovoukas and Berce. Had their inventions been directed towards the same category (L) of applications as the present invention or had they realized that the high intensity, closely coupled solenoid coils they used would mask the dramatic differences in relative efficiency, they would have developed testing procedures and conditions similar to those of the present invention.

Instead they had opposite concerns. Both Monovoukas and Berce were concerned that either the heating rates and/or the temperatures reached by their heating agents were too high and considered steps to limit them. In Monovoukas these concerns lead to considerable discussion regarding the problems associated with overheating the heating matrix and to the selection of heating agents that had Curie temperatures about equal to the temperature to which the article was to be heated. In Berce, similar concerns lead: to even more extensive discussions regarding the problems of too rapid heating in the prior art; to the specification of very small particle sizes that would limit the heating rate; and to the selection of particles that had Curie temperatures near the maximum temperature of polymerization.

Example 2 was designed in order to verify that the results in a Category S coil could mask the high heating efficiency of the fibers of the present invention in a Category L coil.

Figure 2A:
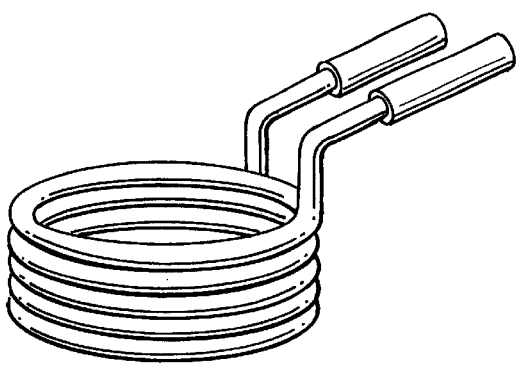
FIGS. 2a to 2f show multiturn coils used in induction heating and in the heating of heating agents.
Figure 2B:
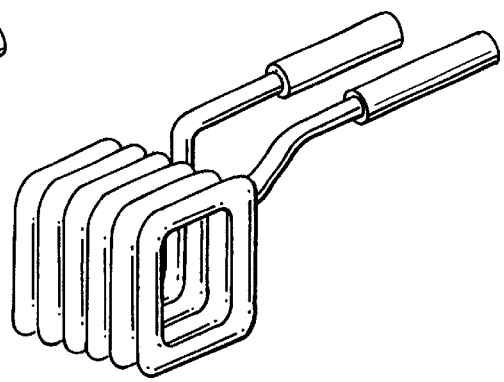
Figure 2C:
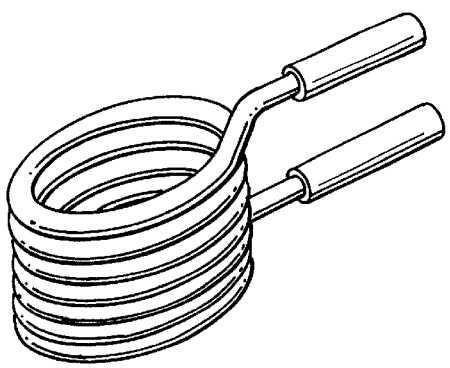
Figure 2D:
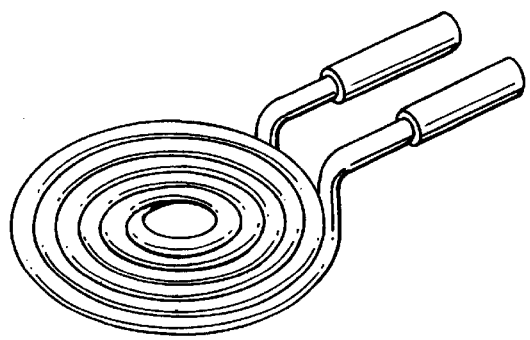
Figure 2E:
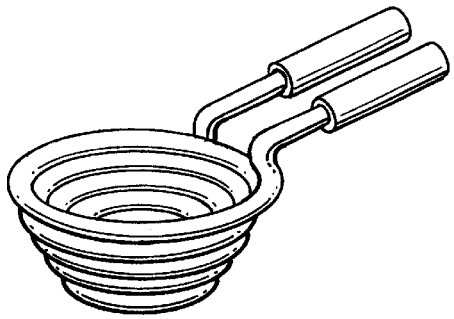
Figure 2F:
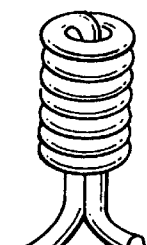

Coil: Example 2 utilizes a 6 turn solenoid coil (similar to FIG. 2a) with internal dimensions of 32 mm in diameter and 42 mm in length. The coil is somewhat larger than Berce's coil which was an oval coil (similar to FIG. 2c) 20 mm×30 mm and 40 mm in length, therefore the field generated by it would be less intense. Monovoukas used a 14 turn solenoid coil 11.2 mm in diameter and 73 mm in length at a frequency of 4 MHz which would create a much more intense field than the coil used in Example 2.

Procedure: 1 g of a heating agent along with 20 g of mineral oil were placed in a 50 Ml round bottom centrifuge tube with an external diameter of 28 mm. (This compares with 3 g of heating agent and 60 g of mineral oil that were placed in the Pyrex cup in Example 1.) The centrifuge tube was centered horizontally in the solenoid coil. The centrifuge tube as not in contact with the water cooled solenoid coil therefore the temperature of the coil did not effect the results of the test. Because the heating agents have different apparent densities 1 g of heating agent with a low apparent density occupied more of the volume of the centrifuge tube than 1 g of a heating agent with a high apparent density. The heating agents were always vertically centered with reference to the coil to assure consistent heating. Oil temperature measurements were made with a digital thermometer probe utilizing a thermistor which was also used to stir the oil and heating agent to transfer the heat from the heating agent to the oil and equalize the temperature of the oil.

Testing: The testing frequencies and RF amperages were: 388 KHz & 150–155 RFAmps; and 488 KHz & 155–165 RFAmps. For reference, this compares with testing frequencies and RFAmps in Example 1 of: 388 KHz & 150–160 RFAmps; and 488 KHz and 165–175 RFAmps. The cycle times were 5 seconds @ 488 KHz and 10 seconds @ 388 KHz. The cycle times were selected for each frequency to balance obtaining measurable temperature changes on the least efficient heating agent without overheating the most efficient heating agent. The change in the heating agent and oil matrix were recorded. In Table III the results are normalized at 20 seconds, as were the results of Example 1 in Table II.

Nickel Flakes

In Monovoukas and Berce all of the nickel flakes heated efficiently

In Example 1 none of the nickel flakes generated any significant heat at any frequency.

In Example 2 all of the nickel flakes heated efficiently.

Nickel Fibers

In Monovoukas the nickel fibers: did not heat as efficiently as the 30×0.4 nickel flake; and did not differ in heating efficiency based on fiber length.

In Example 1 nickel fibers: were far more efficient than any of the nickel flakes; and longer fibers heated more efficiently than shorter fibers, particularly at lower frequencies.

In Example 2 nickel fibers were less efficient than any of the nickel flakes, particularly the 30×0.4$\mu$ nickel flake; but longer fibers maintained their heating efficiency advantage over shorter fibers.

8×4000$\mu$ 300 Series Stainless Steel Fibers

In Berce 8×2000$\mu$ 300 series stainless steel fibers heated more efficiently at 200 KHz than any other material tested.

In Example 1 the 8×4000$\mu$ 300 series stainless steel fibers did not heat efficiently in the KHz range, despite the fiber being twice as long as those of Berce, therefore more efficient.

In Example 2 the 8×4000$\mu$ fibers were among the most efficient heating agents.

Carbon Steel Wool Fibers, Magnetic (400 series) Stainless Steel Wool Fibers, 22$\mu$ Diameter Drawn Magnetic Stainless Steel Fibers Neither Berce nor Monovoukas tested these fibers, therefore they could not recognize their high heating efficiency. They were concerned about finding heating agents that did not overheat the matrix, not about finding a hotter heating agent In Example 1 all of the fibers above were much more efficient than any of the heating agents tested by Berce or Monovoukas.

In Example 2 the gap in heating efficiency between the above fibers and the most efficient of the heating agents of Monovoukas and Berce was considerably smaller.

Nickel Coated Carbon Fiber

Neither Monovoukas nor Berce tested nickel coated carbon fiber.

In Example 1 nickel coated carbon fiber was not efficient in the lower KHz range.

In Example 2 the nickel coated carbon fiber was highly efficient, surprisingly so given its inefficiency at the same frequencies in Example 1.

An analysis of the results from Example 2, in conjunction with the results from Example 1, confirm that the use of Category S coils by Monovoukas and Berce obscured the high heating efficiencies of the species of fibers in this invention. In addition, given their concerns about not overheating the matrix, Berce and Monovoukas had no reason to look for a higher efficiency heating agent.

Example 3

Plastics Welding

The high efficiency fiber heating agents of the present invention have major advantages over the prior art heating agents in a wide variety of applications, some of which were outlined in the Background of the Invention. The previously discussed mineral oil tests demonstrate the remarkably higher heating efficiency of the fibers of the present invention, which would apply to a similar extent to other heating applications, such as those outlined. To discuss and analyze examples from all of the potential applications would prove an unnecessarily monumental and repetitive task resulting in an unmanageably long patent application, therefore one representative application was chosen to illustrate the correlation between the results generated in the mineral oil tests and the practical applications.

Of the applications, the most industry experience and prior art has been directed toward the use of heating agents for the welding or bonding of plastics, therefore this application was chosen for illustrative purposes. The iron powder based plastic welding technology has been the most widely accepted and successful technology, therefore it was selected as the standard for comparison. The technologies based on iron oxide and iron oxide in combination with other heating agents have not been as successful, in part due to the drawbacks discussed above.

Test Criteria—Plastic Welding

Many of the previous tests, including the prior art tests outlined above and the mineral oil tests reflect the degree of heat generated by the heating agent. In actual applications the essential criteria is: can a given heating agent generate a sufficient amount of heat in a given time to achieve the desired end result. For example, in the welding of plastics it does not matter if a heating agent generates some heat in a field of a given frequency and strength. What matters is: 1) is the heating agent able to generate sufficient heat, quickly enough, in both the heating matrix and the substrates to be welded, to overcome the heat loss through the substrate and thus achieve fusion; 2) can it do so in a commercially acceptable cycle time; and 3) does the resulting weld have acceptable strength.

The coupling distance between the coil and the heating matrix of 6.4 mm was selected to reflect common coupling distances in actual applications, particularly where a high efficiency heating agent would be advantageous. As discussed above, reducing the coupling distance by ½ would double the intensity of the magnetic field.

Test Setup and Procedures

Figure 8:
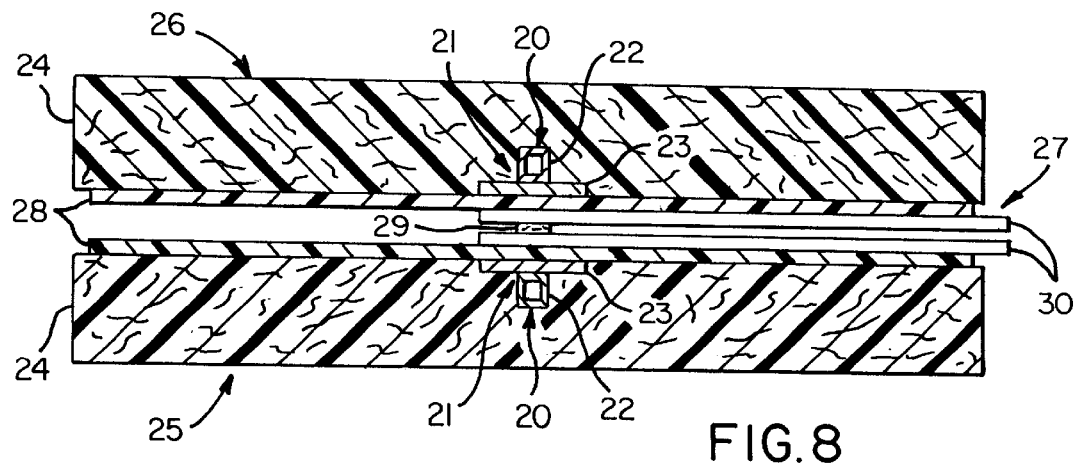
FIG. 8 is a side view of a set-up for testing the heating efficiency of heating agents incorporated in a thermoplastic matrix and placed between two thermoplastic strips, which, in turn are located between coils in an platen press.

The coil (20) (FIG. 8) consisted of two horizontally disposed legs (21), each formed of 5/16 in. square copper tubing (22) brazed to a 25.4 mm wide, 1.52 mm thick copper plate (23), with the copper plates facing each other. The use of such a tube and plate arrangement is common in the industry. The copper plate widens the electromagnetic field and makes precise placement of the heating matrix less critical. The square copper tube carries the cooling water. The two legs (21) of the coil (20) were nested in glass reinforced epoxy plates (24), the combination forming platens (25) and (26), which are parts of an industry standard pneumatically actuated hairpin press. The lower platen (25) of the press was fixed in location and the upper platen (26) was pneumatically raised and lowered to allow placement and removal of the test samples (27) between welds and the application of pressure during the welds.

3.2 mm thick strips of glass reinforced epoxy (GRE) (28) were attached to the upper (26) and lower (25) platens, extending across the 25.4 mm wide copper plates (23) of the coil legs (21). The test samples (27) were placed between the 3.2 mm thick strips of GRE (28) attached to the upper (26) and the lower (25) platens. The 3.2 mm thick strips of GRE (28) acted as spacers to achieve the desired 6.4 mm coupling distance between the coil legs (21) and the strip of heating matrix (29) and eliminated any potential variances associated with the cooling or heating effects of the copper coil (20) on the test samples (27).

Figure 9:
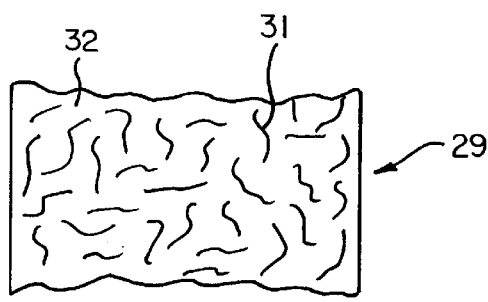
FIG. 9 is a fragmented view of the high efficiency heating agent fibers incorporated in the thermoplastic matrix of FIG. 8.

The fiber and iron powder heating agents were mixed as a percentage by weight with high density polyethylene and extruded into sheets of heating matrix. The sheet averaged approximately 1 mm in thickness and was cut into strips of heating matrix (29) measuring an average of 24.9×6.6 mm. FIG. 9 is a conceptual view of a section of a strip of heating matrix (29) illustrating a heating agent (31) (fibers in this example) in the high density polyethylene base (32).

Figure 10:
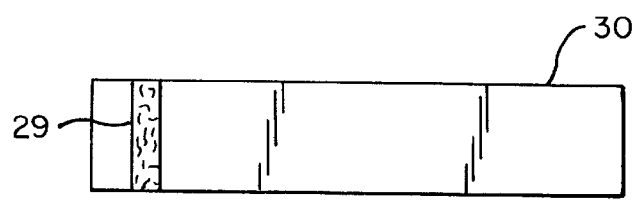
FIG. 10 is a top view of one of the thermoplastic strips of FIG. 8 with the thermoplastic matrix incorporating a heating agent located thereon.

A strip of heating matrix (29) was placed between two 3.2 mm thick high density polyethylene substrate strips (30) measuring 25.4×102 mm. The strip of heating matrix (29) was placed with its length across the 25.4 mm width of the high density polyethylene substrates (30), with its centerline approximately ½ in. from one end of the substrates (FIG. 10).

The test samples (27), each consisting of a strip of heating matrix (29) between the two high density polyethylene substrate strips (30), were placed on top of the 3.2 mm thick strip of GRE (28) which was attached to the bottom platen (25).

The test sample (27) was located so that the length (24.9 mm) of the strip of heating matrix (29) was parallel with long dimension of the lower coil leg's copper plate (23) and the width (6.6 mm) was centered with respect to the width (25.4 mm) of the coil leg's copper plate (23).

The upper platen (26) was lowered, placing the test sample (27) under a consistent pressure and locating it in a similar orientation with respect to the copper plate (23) of the upper coil leg (21) as with the copper plate (23) of the lower coil leg (21).

The resulting distance between the two copper plates (23) of the coil (20) measured slightly more than 12.7 mm.

Numerous preliminary welds were performed for each heating matrix and frequency to determine a reasonable range of cycle times that would result in the strongest welds.

Within that reasonable range of cycle times, specific times were selected for tests to determine the optimum time for a given heating matrix at a given frequency and coil current.

Multiple welds were performed at each of the selected times to provide sufficient samples to generate reliable peel test averages.

Peel tests were performed according to procedures common to the industry. The unwelded ends of the 25.4×102 mm high density polyethylene substrate strips (30) of the test samples (27) were placed in the jaws of an Instron® tester and were pulled to determine the peel strength of the welds (maximum load at yield).

The results for each group of samples (heating matrix, frequency and cycle time) were averaged.

The heating matrices consisted of the following. The larger of the iron particles (74–420$\mu$) used in the mineral oil tests above were incorporated into the high density polyethylene at a 64% by weight loading. This is the heaviest loading commonly used in the prior art (Guglielmo U.S. Pat. No. 3,620,875 1971) and industry and is a heavier loading than the 60% loading used in the tests performed by Leatherman U.S. Pat. No. 4,969,968 (1990). Carbon steel wool fibers similar to the 38×1000$\mu$ fibers used in the mineral oil tests were incorporated into the high density polyethylene at the following loading levels: 10%; 15%; 25%; 35%; and 45%. Magnetic stainless steel wool fibers comparable to the 45×2000$\mu$ fibers used in the mineral oil tests were added to the high density polyethylene at 25% and 35% loading levels.

Based on the preliminary trials, a range of cycle times was determined for each heating matrix, at a given frequency and coil current. Numerous welds were done at each of the cycle times within the range, and the peel strengths for the welds at each cycle time were averaged. The optimum cycle time for comparison purposes was deemed the cycle time above which the increase in peel strength was not significant.

5.5 MHz Test Results

The first series of tests was performed at 5.5 MHz with a coil current of 150–170 RFAmps. Referring to the test data recorded in Table IV, all of the carbon steel wool fiber heating matrices had remarkably faster weld times than the fastest (largest particle and highest % loading) iron powder heating matrix commonly used in the industry.

The very high heating efficiencies of heating matrices of the present invention can be best appreciated by comparing the cycle time of the 64% iron powder heating matrix as a percentage of the cycle times of the heating matrices of the present invention. That a high efficiency heating matrix with 10% loading level is substantially faster than the fastest standard heating agent in the industry is entirely unexpected. That any heating agent of any description can have a heating rate that is 1100% of the fastest heating agent in the industry is more than surprising.

As discussed regarding the mineral oil tests, the rapidity with which the stainless steel fibers weld is even more remarkable. According to the literature, prior art and industry experience, magnetic stainless steel should heat much more slowly than carbon steel; and certainly smaller diameter stainless steel fibers should heat more slowly than the much larger iron powders. Instead, contrary to expectations, the stainless steel wool fiber heating matrices heated virtually as fast as the carbon steel wool fiber heating matrices and much faster than the considerably larger iron powder heating matrices.

Both Berce and Monovoukas were very concerned that heating agents which heated too rapidly or to too high a temperature would seriously degrade the strength of the matrix. Contrary to those expectations, and despite their very rapid heating rates, the peel strengths of all of the carbon and stainless steel fiber based heating matrices exceeded that of the much slower iron powder. The fiber based heating matrices appear to have very wide cycle time windows without degrading the heating matrix or significantly effecting the peel strength. For example, the 10% loaded carbon steel fiber heating matrix has a peel strength that is high at a 12 sec weld cycle, optimum at 14 sec weld cycle and remains high beyond a 48 sec weld cycle. An acceptable weld cycle time range of more than four times has numerous benefits including: significantly diminished concern about overheating and degrading the heating matrix; wider latitude in the consistency of loading levels; less concern about exact part tolerances and coil coupling distances; and thus a larger, more easily hit target for acceptable welds in production.

3.6 MHz Test Results

The second series of tests was performed at 3.6 MHz with a coil current of 85–95 RFAmps, the results of which are recorded on Table IV. With the 64% iron powder it was not possible to create an acceptable weld regardless of how many minutes the cycle ran. The best that could be achieved was a slight bond that was less than ⅓ to ¼ the strength of the welds formed by the fibers. This occurred at a 130 second cycle time and never improved significantly with additional time. In contrast the high heating efficiency matrices of the present invention had surprisingly low weld times.

The 64% loaded iron powder heating matrix was unable to generate sufficient heat rapidly enough to overcome the heat lost to the substrates. Despite the low frequency and low coil current, the high efficiency fiber based heating matrices were able to create strong welds in commercially acceptable cycle times. The low frequency and low coil current are representative of the problems associated with long coils and the iron powder results are illustrative of the prior art's inability to create acceptable welds under those conditions.

Consistent Correlation Between the Plastic Welding Tests, Mineral Oil Tests, and Other Applications The results in the plastics welding tests directly correlate with the heating efficiency results in the mineral oil tests. The correlation is consistent in other plastics welding tests in the KHz range. The minimum frequency at which the fibers generate heat efficiently has not yet been found, however tests have been conducted at 60 KHz and only 200 watts, in which plastic welds were successfully created.

The high efficiency fibers have direct application in each of the applications provided as examples in the Background of the Invention and in many others in which high heating efficiency is important. The high heating efficiency fibers of the present invention will overcome the short comings of the prior art and realize the advantages as discussed in the Background of this Invention. In addition they will make entirely new applications possible, and make previously uneconomic or impractical applications viable as well as increasing the productivity of existing applications. The high efficiencies will also make it possible to use solid state generators for the first time with all of the attendant benefits discussed above.

To the inventor's knowledge the very high heating efficiency of the fibers of the present invention and the resulting multitude of advantages were entirely unpredicted and unanticipated by the industry, the prior art or the literature. Had it been considered even a possibility, let alone obvious, industry would have immediately pursued it, given its revolutionary advantages.

Solutions and Advantages

In addition to overcoming the short comings of the prior art discussed above, the high efficiency fibers have numerous other advantages, some examples of which follow and others will be clear to those skilled in the art.

1) Hold and cool times are a significant portion of the total welding or joining cycle. By generating heat very rapidly, only the small portion of the substrate that contacts the heating matrix is heated, therefore the rest of the substrate can act as a heat sink, rapidly drawing away the heat from the fusion area and thereby first setting and then cooling the part. In this way the holding and cooling times can be significantly reduced, thereby reducing the over all cycle time and increasing production.

2) For similar reasons, rapid heating rates reduce the distortion of the outer surface of the part and make it possible to weld or join parts with thinner wall thicknesses. Less total heat goes into the weld or joint area and less is transferred through the substrate. Therefore both the part, and in particular its outer surface, do not get as hot and thus do not distort.

3) Because the required loading levels of the fibers are so much lower than those of prior art iron powder the welds or joints are inherently stronger as there can be more polymer and less filler.

4) New aesthetically critical applications are possible due to the low levels of loading made possible by the high efficiency of the fibers of the present invention. A heating matrix with a 10% loading of carbon steel fibers in plastic is nearly transparent and could be used in that condition or easily tinted or colored.

5) The prior art must frequently use lower viscosity, lower molecular weight polymers or matrices in order to get the loading levels high enough. Because of the low loading levels required by the fibers it is possible to use a much wider range of polymers and additives resulting in enhanced properties and better end results.

6) The low loading levels of the fibers make it possible to add materials to increase the properties of the heating matrix. For example, glass fiber, carbon fiber, drawn steel fiber and nickel coated carbon fiber can be added to increase the tensile and flexural strength. In the prior art, many times the joints failed cohesively. In other words, the strength within the heating matrix was less than the strength of the bond between the heating matrix and the substrate and the heating matrix would fail through the center. Particularly with engineering or structural materials the heating matrix was much weaker than the substrate material and therefore the process was rejected. By adding the reinforcing materials to the fiber based heating matrices the heating matrices will be much stronger and therefore suitable for high performance (and high dollar) applications.

7) The conductive tensile reinforcing fibers such as carbon fiber, drawn or rapidly solidified stainless steel fibers and nickel coated carbon or nickel coated glass fibers can not only add strength to the heating matrix but can generate some additional heat, unlike the glass fibers. This can act to reduce cycle times and evenly distribute the heat in the heating matrix. Tests suggest that the 7–8$\mu$ diameter nickel coated carbon fibers are surprisingly efficient generators of heat, particularly given that the nickel coating is less than one micron in thickness. They appear to be significantly more efficient generators of heat than the solid 8$\mu$ stainless steel fibers. In addition, the tests suggest that there is a still more surprising synergistic heating effect when carbon steel or stainless steel wool fibers are combined with nickel coated carbon fibers. In the mineral oil tests, a combination of carbon or stainless steel wool fibers and nickel coated carbon fibers totaling 3 grams generates more heat than 3 grams or either component separately.

8) Because the fibers have a higher apparent bulk density than the iron powders the fibers will tend to stay in suspension longer in liquid based heating matrices for example: thermosets—e.g. epoxies and urethanes; hot melt adhesives; thermoplastic or thermoset adhesives etc. This also allows the use of lower viscosity liquids.

9) Recycling of parts welded or cured by the prior art iron powders or iron oxides has always been a major problem. Because the iron powders and iron oxides are spherical in shape they are not captured by the equipment's filtering system and contaminate the new parts. This can lead to unacceptable aesthetic or performance deficiencies. In addition it can result in contaminated portions of the new parts heating outside the joint during the joining process, thereby destroying or weakening the parts, sometimes in ways that become apparent only in the field.

The manufacturers' responses have been to scrap the entire part or to have workers laboriously cut out the joined portions of the part by hand, at significant cost. Because the fibers are much longer they can more easily be captured and removed by the equipment's filtering systems, either on the primary equipment or on smaller auxiliary equipment for that purpose. Thus the use of fiber based heating matrices allows the manufacture to significantly cut their scrap losses, which is particularly important with fibers as they allow the usage of high performance (and high cost) engineering materials.

Environmental pressures have increased manufacturers' concerns regarding the recycling of their products at the end of their useful life. Recyclers may not be knowledgeable about and cannot afford the cost of laboriously cutting out the portion of parts contaminated by the prior art welding systems. This has caused some manufacturers to choose other bonding or welding processes. With the ease of removing the fibers from the recycling stream this obstacle will be removed.

10) In the industry there has been an important and long standing need for a nonreactive, nonrusting heating agent that generated heat efficiently. As was noted in Leatherman U.S. Pat. No. 4,969,968 (1990) the sub-micron iron oxides present a large surface area which increases the reaction when exposed to certain chemicals. Similar problems have been encountered with iron powders. Stainless steel powder has been used in the industry (e.g. Guglielmo U.S. Pat. No. 3,620,875—1971) with limited success because even with stainless steel powders that were larger than the standard iron powders, the heating agent was relatively inefficient. The cycle times were long, the cost was much higher and the coupling distances and coil lengths needed to be smaller to increase efficiency. Many valuable applications were just not possible and others were not viable due to cost or cycle times. Given that even magnetic stainless steel has significantly larger skin depths than the standard iron, this was not surprising. What is surprising is the remarkably high heating rates of the 400 series stainless steel fibers. All of the 400 series stainless steel fibers had dramatically higher heating rates, at all frequencies, than even the largest iron powder, i.e. the 74 –420$\mu$ iron powder. This suddenly opens up a myriad of new applications where a nonreactive, nonrusting heating agent is either desirable or essential. Not only will there not be a performance penalty relative to the 74–420$\mu$ iron powder, there will be a dramatic performance advantage.

11) A significant advantage of the use of a heating agent in a number of applications such as thermoplastic welding, or the heating of thermoplastic adhesives or elastomers is that the process in many cases can be reversed. In other words by putting substrates back in an induction field the heating agent reheats the substrates and allows the separation of the substrates. Because the prior art heating agents are very inefficient in comparison with the fibers of the present invention this has frequently proven impractical due to the requirement for large generators operating at high power and high frequency. The high heating efficiency of the fibers and their ability to heat efficiently at low frequencies has made it possible to use compact, portable, solid state generators. In combination this makes practical, for the first time, in-the-field unwelding or debonding and rewelding or rebonding. This leads to diverse applications including, for example: the salvaging or repair of expensive components from sealed containers; or the repair of expensive substrates such as composite airplane components.

In addition to the modifications discussed previously, numerous other modifications are possible, examples of which follow.

1) The heating agents can be made nonconductive by treating them with phosphoric acid or coating them with nonconductive materials such as ferromagnetic oxides. In some applications the components need to retain a high dielectric strength. An added benefit is that the resulting heating agent is arc resistant. Arcing occurs when the electrical current jumps from the coil to the heating matrix, which can damage the part, the fixture or the generator. In the prior art iron powder heating matrix this is particularly problematic because the iron powder particles form hot centers which quickly tunnel through the heating matrix and form a powder rich leading edge, which gets squeezed out of the joint. This powder rich leading edge can remain at the joint, making a potential target for the coil to arc to. It may also run down the edge of the part and into direct contact with the coil and fixture. Because the fibers evenly distribute the heat they do not form hot centers and because of their shape they do not tunnel through the heating matrix. This makes the untreated fibers naturally arc resistant. Treating either the fibers or the iron powders will make them more arc resistant.

2) Conversely the fiber based heating matrices can be made more conductive with the addition of carbon black, carbon fibers, stainless steel fibers, nickel coated carbon fibers, chemical additives, etc. The conductivity could be advantageous in certain applications, such as when the parts must have high static dissipation or electromagnetic interference resistance characteristics, etc.

3) Because of the high efficiency of the fibers and the resulting low required loading levels, the fiber based heating matrices can more readily accept additives to modify their physical characteristics. Such additives could be used to increase the fiber based heating matrices' impact strength, flexibility, U-V resistance, heat stability, flame/smoke retardance. Other additives could be used to regulate the thickness of a thermoplastic weld or adhesive bond including, for example: glass, ceramic, or thermoset granules, beads or particulate which can optionally be coated with a ferromagnetic or ferrimagnetic material to heat in the alternating magnetic field; or metallic granules, beads or particulate which could also potentially heat in the field.

Ramifications and Embodiments

The high heating efficiency fibers of the present invention can be utilized highly advantageously in a myriad of ramifications and embodiments, in addition to those disclosed above. For many of these ramifications and embodiments there are numerous methods and means to utilize the fibers of the present invention. The following are illustrations of but a fraction of the multitude of ramifications and embodiments and associated methods and means; and should be interpreted by way of example and not by way of limitation. Other ramifications, embodiments and associated methods and means related to the high heating efficiency fibers of the present invention will become apparent to those skilled in the art. In the interest of economy, within the Ramifications and Embodiments section, the term "Fibers" is intended to refer to the high heating efficiency fibers of the present invention, while the non-capitalized "fibers" is intended to refer to fibers other than those of the present invention.

Fiber specifications: The Fibers of the present invention are ferromagnetic which include, for example, iron, nickel, cobalt and alloys thereof. Tests have suggested that nonmagnetic fibers are less efficient than magnetic fibers. Therefore the Fibers of the present invention have a magnetic permeability of >1, preferably somewhat greater than one, and still more preferably considerably greater than 1. Examples of Fibers within those categories include, for example: carbon steel fibers; magnetic stainless steel fibers; nickel fibers; ferromagnetic coated conductive fibers; and ferromagnetic coated nonconductive fibers. Additional examples include, for example, Fibers composed of the ferromagnetic alloys suggested above which could have advantages such as: higher permeability; specifically chosen Curie temperatures; ease of manufacturing; and/or ease of use.

The minimum diameter at which the Fibers are effective has not been determined. For carbon steel and magnetic steel wool fibers the manufacturing technology currently limits the minimum average fiber diameter to approximately $15\mu$. In drawn magnetic stainless steel fiber the manufacturing limits are currently approximately $22\mu$ in diameter. Drawn nonmagnetic stainless steel fiber is available in smaller diameters. The nickel coated carbon fibers currently available are $7-8\mu$ diameter carbon fibers with nickel coating levels ranging up to 90%+by weight. The minimum fiber diameter of the Fibers of the present invention is that diameter which heats efficiently. To date that minimum Fiber diameter is $\geq 6\mu$.

While there is no maximum diameter at which the Fibers will heat efficiently, the maximum practical diameter will depend on the application. The maximum diameter of the Fibers of the present invention could be defined as <4 skin depths. In some tests the Fibers have been shown to heat efficiently at <3 skin depths, at <2 skin depths and in some instances at <1 skin depth.

The Fiber can be in the form of: chopped fiber; continuous fiber; and continuous or random length woven mat and nonwoven mat. The minimum chopped Fiber length is again limited by manufacturing technology and, in part, is dependent on Fiber diameter and composition. The maximum practical Fiber length is dependent upon the application.

The high efficiency heating agent of the present invention consists of the Fibers as opposed to the prior art heating agents which consisted of ferromagnetic powders or ferrimagnetic oxides both of which are roughly spheroid in shape. Fibers as a class have aspect ratios greater than those of powders which, as spheroids, have an aspect ratio of roughly 1. The Fibers of the present invention have a minimum aspect ratio of >1, preferably >3 and still more preferably >5.

Fiber forms: The Fibers of the present invention may be: continuous, semi continuous or in lengths. The lengths may be consistent or random, their lengths having been determined, for example by: cutting, chopping, hammermilling; or as a step or a byproduct of their method of production, or their method of incorporation in/on a matrix or substrate. The Fibers may be discrete from one another, intermingled or intertwined with one another or adjacent to one another. The Fibers may be individual Fibers or groupings of Fibers. The groupings may be substantially unidirectional, isotropic or random. The groupings of Fibers may take numerous forms, for example a mat, a strip, or a strand.

The chopped, continuous or semicontinuous Fibers may be intermixed with other fibers, powders or granules to modify or enhance the characteristics of the Fibers or the resultant mix. The other fibers may, for example, include: glass, carbon, graphite, ceramic or mineral fibers which may optionally be coated with ferromagnetic materials; or thermoplastic fibers, optionally to melt and bind the ferromagnetic Fibers of this invention or to enhance the strength of the resulting mixture including, for example, ararmid fibers.

Locations of the Fibers: The Fibers of the present invention may be incorporated in a heating matrix, a substrate, or a matrix intended to transfer heat to surface or substrate. They may be adjacent to, on, or in thermal contact with, a substrate.

Purposes for the heat generated by the Fibers: Heat is generated by the Fibers for numerous purposes including: melting; curing; bonding; welding; fusing; degassing; drying; foaming; adhering; starting or accelerating catalytic reactions; initiating polymerization; reducing viscosities; or transferring heat to a material or substrate.

Substrates: The substrates can vary widely in composition or form, including, for example: porous; solid; fibrous; woven or nonwoven; thermoplastic, thermoset; metallic; composite glasseous; ceramic; wood; paper; or cardboard.

Matrices incorporating or associated with the Fibers: There are numerous matrices that can incorporate or be associated with the Fibers including: ceramic; cementatious; thermoplastic; thermosetting; elastomeric; adhesive; hot melt; composite; conductive; or nonconductive.

Applications utilizing the Fibers: Numerous applications can utilize the Fibers including: thermoplastic welding or bonding; thermoset curing; curing of thermoset adhesives or thermoset/thermoplastic adhesives; adhesive melting, applying or activating of hot melts or thermosetting hot melts; curing, applying or activating elastomeric adhesives; sealant activation, melting, or curing; elastomer curing or melting; heat sealing; shrinking of thermoplastics; thermoset composite forming, molding, curing, preforming, tacking, building up of layers, staged or partial curing; thermoplastic composite forming, molding, consolidating, laying or building up of layers; high temperature engineering resin, forming, fusing, or bonding, particularly when reinforced with carbon, graphite, aramid or glass fiber; initiation or acceleration of foaming in thermoplastics, thermosets, or adhesives; or generation of heat in containers, inserts or tooling for transfer to materials in thermal contact there with.

Incorporation of Fibers in or associated with thermoplastic matrices: Examples of suitable thermoplastics for use in conjunction with the Fibers of this invention can be found in a number of references in the field including, for example: Modern Plastics Encyclopedia '98, published by McGraw-Hill, which is incorporated herein by reference for all purposes. The chopped Fibers can be incorporated in a thermoplastic matrix by a number of methods including, for example: extrusion; injection molding; rotomolding; blow molding; compression molding; bulk molding; heat sealing between sheets or films; coextrusion; and crosshead extrusion. The continuous or semicontinuous Fibers can also be incorporated in a thermoplastic matrix by numerous methods including: crosshead extrusion; powder coating; pultrusion; coextrusion; or heat sealing between sheets or films. Chopped Fibers can be incorporated into a mat, strip or preform by a number of methods including: air laid; wet laid; blown; or mechanical distribution systems such as shakers, screens and the like. The resultant mats, strips, preforms or the like can be incorporated with thermoplastics via powder coating, spraying, dipping or the like. The continuous Fibers, semicontinuous Fibers or fiber mats can subsequently be slit for use as a heating matrix in that form, or subsequently chopped; chopped without preslitting; or ground or diced into pieces, pellets or granular mixtures.

Alternatively granular mixtures can be formed by numerous means including: mixing chopped Fibers with thermoplastics in the form of pellets, powders, flakes or chips. The granular mixture can be loose or the Fibers can be attached or adhered to the thermoplastic particulate by various heating means including: infrared; induction; dielectric; conduction; or convection. Additional means for adhering or attaching the Fibers to the thermoplastic particulate include: electrostatic attraction; adhesives; or temporary or permanent fluid adhesion. The granular mixture of Fibers and thermoplastic particulate can be incorporated into a thermoplastic matrix by any of the methods outlined above.

Location of the Fibers adjacent to a substrate: In addition, either the Fibers alone or in combination with the thermoplastic particulate (either loose or adhered/attached) can be placed adjacent to or between one or more substrates. If the substrate is nonreactive the granular mixture of Fibers and thermoplastic particulate could provide the reactive element with a number of results or reactions including: fusing; bonding; welding; adhering; or sealing.

If one or more of the substrates is thermoplastic, elastomeric, unreacted thermoset or otherwise reactive then the Fibers alone can generate heat in an alternating magnetic field and react with or initiate or accelerate a reaction in the substrate. Numerous such reactions or results therefrom include: fusion, welding, bonding, adhering, curing, tackifying, sealing and the like. Alternatively, if the substrate is nonreactive the heat generated by the Fibers can be transferred to the substrate for a variety of purposes.

The Fibers alone or in combination with the thermoplastic particulate can be distributed over a surface or surfaces of one or more substrates by a myriad of methods including: blowing, shaking, sifting, scattering, dropping and the like. Either the Fibers alone or in combination with the thermoplastic particulate can be: unattached or unadhered to the substrates. Alternatively either the Fibers alone or in combination with the thermoplastic particulate can be fixed on a surface of a substrate by a multitude of methods including: adhesion; electrostatic attraction; magnetic attraction, either by permanent magnets or electromagnets; fluid adhesion, either residual or transient; or via mechanical features of a substrate, including grooves, indentations, textures, and the like. Alternatively either the Fibers alone or in combination with the thermoplastic particulate can be thermally fixed on a surface of a substrate by diverse methods including: induction, dielectric, infrared, or convection heating; conduction heating by means of rollers, plates, platens, rods and the like; or combinations thereof. If the substrate is a woven or nonwoven mat, bat or fabric the Fibers can also be fixed in place by interentanglement with the substrate by means of vibrating, pressing or needlepunching.

Incorporation of the Fibers in or associated with thermoplastic substrates: The methods and means for incorporating Fibers in or associated with a thermoplastic matrix also apply when the Fibers are incorporated in or associated with a thermoplastic substrate. The Fibers in the substrate (substrate 1) may generate sufficient heat to cause the substrate to fuse, bond, weld, adhere, etc. to one or more substrates or matrices of similar or dissimilar composition or form which do not contain Fibers and therefore do not heat in an alternating field. Alternatively the one or more of the substrates or matrices other than substrate 1 may optionally: include Fibers and therefore heat in the alternating magnetic field; or be part of a group of conductive and/or ferromagnetic and/or ferrimagnetic materials that heat in an alternating magnetic field, preferably at lower heating rates than the Fibers in substrate 1.

Thermoplastic and Thermoset Composites: The Fibers of the present invention can be readily incorporated in thermoplastic and thermoset composites by many of the methods regularly utilized for: the incorporation of other fibers in thermoplastic and thermoset composites; and the related manufacturing processes and means. This, as well as the thermoplastic and thermoset materials themselves and related additives, modifiers and catalysts are described in many handbooks and texts on the subjects including, for example, Engineered Materials Handbook™ Volume 1—Composites, published by ASM International, which is incorporated herein by reference for all purposes. The high efficiency heating capability of the Fibers of the present invention makes possible a myriad of improvements to most existing composite manufacturing methods. The improvements are based on the improved capacity that the Fibers provide to rapidly, selectively and controllably heat a portion of the composite or the entire composite. The rapidity and/or intensity of the heating can be controlled by varying: the loading of the fibers in the composite; the magnitude of the coil current; the frequency of the alternating magnetic field; the shape of the coil; or the distance between the coil and the Fibers in the composite. The coil can be fixed; movable; scanning; traversing; flexible or rigid.

As with the other applications, methods and means associated with the Fibers discussed in the present patent application; the high efficiency of the Fibers can significantly, and frequently dramatically, reduce the cycle times and increase the production rates of the thermoplastic and thermoset composites. In addition, the high heating efficiency of the Fibers makes new products possible, previously uneconomic products viable, and existing products more profitable. The high heating efficiency and the high potential temperatures of the Fibers make it possible to utilize them with high temperature engineering resins and composites. Because of the small diameters of the Fibers and low loading levels required by the Fibers their inclusion in a composite or between composites has less impact on the physical characteristics of the composite than alternative heating agents.

In many respects, the disclosures in the discussion regarding the use of Fibers associated with thermoplastics, are similar to those used in thermoplastic and thermoset composites and as such should be interpreted as applying in most respects to thermoplastic and thermoset composites. Whether the matrix or substrate is: thermoplastic; or a thermoplastic or thermoset composite; (or an adhesive; or any of a number of materials), the Fibers can be incorporated in a heating matrix, a substrate or a matrix intended to transfer heat to a surface or substrate. They may be adjacent to, on, or in thermal contact with, a substrate.

Adhesives & Sealants: There are numerous adhesives and sealants that would be significantly improved with the addition of Fibers of the present invention, lists of which along with modifiers, additives, and related processes are readily available in handbooks and texts including, for example: Engineered Materials Handbook™, Volume 3, Adhesives and Sealants, published by ASM International which is incorporated herein by reference for all purposes. Adhesives combined with high efficiency heating agents have numerous advantages, many of which are similar to those related to plastic welding. Heat is immediately generated directly at the bond line without the delay required for the heat from an external source to penetrate the substrate. The substrate is not overheated by the external source nor is it heated through from the inside out thereby distorting the substrate which occurs when the heating rate is too low, as with the prior art heating agents. The efficiency with which the Fibers conduct the heat through the adhesive or sealant and the absence of hot spots associated with iron powder based heating agents minimize the degradation of the adhesive or sealant and enable the use of higher heating rates. The high heating efficiency of the Fibers allows the coupling distance to be greater, making it possible to rapidly bond substrates where the coil cannot be placed in close proximity with the adhesive or heating agent, either due to substrate thickness or geometry. Unlike UV cured adhesives the substrate need not be translucent and can be substantially thicker.

The high heating efficiency of the Fibers effects each of the adhesives and sealants differently dependent on the characteristics of the base resins. If the base resin is a thermoset such as an epoxy or a urethane the rapid generation of heat in the adhesive allows the adhesive to quickly attain green strength at which point the substrates can be moved and the process repeated. Alternatively, a full cure can be completed in a fraction of the normally required time. If the base resin is a thermoplastic, either an engineering adhesive or a hot melt, it reacts to the heat by melting, similar to standard thermoplastics, then bonds to a substrate. An elastomeric adhesive can be thermoplastic or thermoset or a hybrid of both and will react accordingly. Sealants can also fall into any of the categories.

Thermoplastic, thermoplastic/thermoset, hotmelt and thermoplastic elastomer adhesives share a characteristic; that they will tend to remelt with the reapplication of heat. This lends them to a multitude of applications which can take advantage of the high heating efficiencies of the Fibers. For example, Fibers can be incorporated with any of this group of adhesives and the adhesives applied to one or more substrates and allowed to cool. At this point the substrates may be handled without concern regarding the stickiness of the adhesive (the exceptions are adhesives that are designed to remain tacky). At a chosen time the adhesive on the substrate may be reactivated or remelted in an alternating magnetic field while in contact with, or then placed in contact with, one or more substrates to create a bond. There are distinct advantages to being able to handle substrates without concern and then, when desired, generate a bond in seconds. Numerous applications would greatly benefit from this approach including: packaging, such as the sealing of boxes and containers; or assembly operations where the substrate can be placed by hand or by automation.

As with the thermoplastic and composite categories outlined above the Fibers can be utilized with the adhesives in a variety of methods and embodiments. For example the Fibers may be incorporated in an adhesive or sealant matrix by: mixing, blending, or other distributive means, of discrete fibers or groups of fibers into one component of the adhesive or sealant, or into more components if it is multi-component adhesive or sealant; or applying the adhesive or sealant to the fibers by spraying, dipping, spreading or the like. If the fibers are in the form of a mat, strand, sheet or other groupings of fibers, additional methods of applying the adhesive could include: pultrusion, crosshead extrusion, or layering between sheets of adhesive.

The adhesive may be applied on a surface of a substrate and the fibers applied subsequently, while the adhesive is still tacky. In the case of thermoset adhesives the substrate would then be placed in contact with another substrate and the heat generated by the Fibers used to accelerate the cure. In the case of thermoplastic, thermoplastic/thermoset, hot-melt and thermoplastic elastomer adhesives the substrate could be placed in contact with another substrate shortly thereafter and the heat of the Fibers utilized either to maintain the melted state of the adhesive or to overcome the cooling effect of the other substrate. Alternatively the combination of the adhesive and the Fibers could be allowed to cool for use at a later time.

The Fibers could also be distributed over an adhesive substrate, either in the form of a sheet or film or in a less two dimensional form. The Fibers could then be heated by an alternating magnetic field or other means and incorporated into the adhesive substrate. Alternatively, the fibers could be distributed on a first adhesive substrate as described above and covered to some degree by a second adhesive substrate. In a similar fashion heat could be applied to or generated in the Fibers and an adhesive laminate formed. Alternatively, an adhesive substrate that already incorporated the Fibers could be formed by any of the means outlined above. In any of these alternatives the Fibers themselves could be in any of the physical forms discussed previously. Regardless of how it was formed, the Fiber/adhesive matrix could be placed between two or more substrates to bond them together or on a substrate for subsequent reheating and bonding to one or more substrates.

Also in parallel with the discussion regarding thermoplastics above (the more detailed descriptions of methods and means above being incorporated herein), adhesives in the form of powders, flakes, pellets or other particulate or granule can be mixed with the Fibers. The Fibers and granules can be unattached or attached to one another. The granular mixture can subsequently be distributed on a substrate and can be lose or fixed in location on the surface of the substrate. The substrate can be immediately or subsequently bonded to one or more substrates.

The low loading requirements of the Fibers minimize the effects associated with the inclusion of a heating agent in the adhesive. Prior art technologies have not been commercially successful as heating agents for adhesives. The iron oxide based heating agents are difficult to disperse in the adhesive without agglomeration and require high loading levels that degrade the strength of the bond. The iron powder based heating agents require high loading levels, are difficult to keep in suspension, and are abrasive on equipment. It is reported that iron oxide based materials have a negative chemical reaction with some adhesives, particularly urethanes, and it may be that the iron powders do as well. As discussed earlier, stainless steel powders have not had substantial commercial success in part due to their low heating rates, high required loading levels and high cost. Conversely, magnetic stainless steel Fibers of the present invention are excellent candidates in reactive adhesives due to their inertness, high heating efficiency and low required loading levels. In addition, numerous applications cannot accept the tendency of the prior art heating agents to leach or otherwise release rust.

Elastomers: Elastomers fall into two general categories, thermoplastic elastomers and thermoset elastomers. The methods and means of utilizing Fibers in conjunction with the two types of elastomers parallel their use in related categories as discussed above and need not be repeated here. Again, extensive information regarding the types of elastomers and the applicable additives, modifiers and methods of use are available in numerous texts and handbooks including, for example: Thermoplastic Elastomers, 2nd edition, by Holden, Legge, Quirk and Schroeder, published by Hanser; and Elastomer Technology Handbook, edited by Chereminsinoff, published by CRC Press, all of which are incorporated herein by reference for all purposes.

Having thus described the invention of the present application in detail and by reference to preferred embodiments thereof, it will be apparent that modifications and variations are possible without departing from the scope of the invention defined in the appended claims.

What is claimed is:

1. A thermoset heating composition comprising:
    a thermal processing agent; and
    a thermoset material, said thermal processing agent being dispersed in or on, coated upon or otherwise associated with said thermoset material whereby said thermoset material is thermally processed by said thermal processing agent when exposed to an alternating magnetic field and said thermal processing agent comprising:
        fibers including ferromagnetic material having a permeability greater than 1;
        said fibers being of a selected composition of one or more ferromagnetic materials; and
        said fibers having a heating efficiency of greater than 150% of the heating efficiency of 74–420μ iron powder in a corresponding alternating magnetic field.

2. A thermoset heating composition as claimed in claim 1 wherein the heating efficiency of said fibers is greater than 200% of the heating efficiency of 74–420μ iron powder.

3. A thermoset heating composition as claimed in claim 2 wherein the time required to thermally process said thermoset heating composition is less than 75% of the time required to thermally process a thermoset heating composition comprising a similar thermoset material and an equivalent weight of a thermal processing agent comprised of 74–420μ iron powder, in a corresponding alternating magnetic field.

4. A thermoset heating composition as claimed in claim 2 wherein the ferromagnetic material of said fibers is selected from the group consisting of: iron, nickel, cobalt, chromium and their alloys.

5. A thermoset heating composition as claimed in claim 2 wherein said fibers are selected from the group consisting of: carbon steel fibers and magnetic stainless steel fibers.

6. A thermoset heating composition as claimed in claim 2 wherein said fibers are selected from the group consisting of: carbon steel wool fibers, magnetic stainless steel wool fibers and nickel wool fibers.

7. A thermoset heating composition as claimed in claim 2 wherein said fibers are of a selected composition including one or more ferromagnetic materials and are of an average diameter such that, based upon a critical frequency calculation performed by solving the equation $fc=1.6 \times 10^8 \, p/\mu \, a^2$ where p=resistivity at a selected temperature in ° F., μ=permeability, and a=diameter of the heating agent in inches, said fibers are expected to heat effectively at a first frequency equal to or greater than said critical frequency, but surprisingly and unexpectedly said fibers will heat effectively at a second frequency less than 75% of said critical frequency.

8. A thermoset heating composition as claimed in claim 7 wherein said fibers will heat effectively at a second frequency that is less than 50% of said critical frequency.

9. A thermoset heating composition as claimed in claim 7 wherein said fibers will heat effectively at a second frequency that is less than 10% of said critical frequency.

10. A thermoset heating composition as claimed in claim 2, wherein said fibers are of a selected composition including one or more ferromagnetic materials; and
    said fibers have an average electrical diameter less than 3.5 times said fibers reference depth d which is determined using the equation $$d = 3160\sqrt{p/\mu f}$$

where p=resistivity at a selected temperature in ° F., μ=permeability, and
f=frequency as calculated for a selected frequency and fiber composition.

11. A thermoset heating composition as claimed in claim 10, wherein said average electrical diameter of said fibers is less than 2 times said fibers' reference depth.

12. A thermoset heating composition as claimed in claim 10, wherein said average electrical diameter of said fibers is less than 1.0 times said fibers' reference depth.

13. A thermoset heating composition as claimed in claim 2, wherein said fibers have average diameters less than 75% of the average or mid particle size range of particles of 74–420μ iron powder wherein said mid particle size range is equal to $$((420\mu - 74\mu)/2) + 74\mu = 247\mu.$$

14. A thermoset heating composition as claimed in claim 13, wherein said fibers have average diameters less than 25% of the average or mid particle size range of said 74–420μ iron powder.

15. A thermoset heating composition as claimed in claim 13, wherein said fibers have average diameters less than 10% of the average or mid particle size range of said 74–420μ iron powder.

16. A thermoset heating composition as claimed in claim 2, wherein said apparent density of said fibers is less than 75% of the apparent density of said 74–420μ iron.

17. A thermoset heating composition as claimed in claim 16, wherein said apparent density of said fibers is less than 25% of the apparent density of said 74–420μ iron.

18. A thermoset heating composition as claimed in claim 16, wherein said apparent density of said fibers is less than 5% of the apparent density of said 74–420μ iron.

19. A thermoset heating composition as claimed in claim 2, wherein said heating efficiency of said fibers is greater than 400% of the heating efficiency of said 74–420μ iron powder.

20. A thermoset heating composition as claimed in claim 2, wherein said heating efficiency of said fibers is greater than 1000% of the heating efficiency of said 74–420μ iron powder.

21. A thermoset heating composition as claimed in claim 2, wherein said heating efficiency of said fibers is greater than 1500% of the heating efficiency of said 74–420μ iron powder.

22. A thermoset heating composition as claimed in claim 2, wherein a loading rate of said fibers by weight of said thermoset material with which said thermoset heating composition is used is less than 75% of a loading rate of particles of powder of a ferromagnetic composition by weight of said thermoset material for a required heating rate.

23. A thermoset heating composition as claimed in claim 22, wherein a loading rate of said fibers by weight of said thermoset material is less than 50% of a loading rate of said particles of powder of a ferromagnetic composition by weight of said thermoset material for a required heating rate.

24. A thermoset heating composition as claimed in claim 22, wherein a loading rate of said fibers by weight of said thermoset material is less than 10% of a loading rate of said particles of powder of a ferromagnetic composition by weight of said thermoset material for a required heating rate.

25. A thermoset heating composition as claimed in claim 3 wherein said time required to thermally process said thermoset heating composition is less than 25% of the time required to thermally process a thermoset heating composition comprising a similar thermoset material and an equivalent weight of a thermal processing agent comprised of 74–420$\mu$ iron powder in a corresponding alternating magnetic field.

26. A thermoset heating composition as claimed in claim 3 wherein said time required to thermally process said thermoset heating composition is less than 5% of the time required to thermally process a thermoset heating composition comprising a similar thermoset material and an equivalent weight of a thermal processing agent comprised of 74–420$\mu$ iron powder in a corresponding alternating magnetic field.

27. A thermoset heating composition as claimed in claim 2, wherein said fibers are selected from the group consisting of: nickel fibers, ferromagnetic coated electrically conductive fibers and ferromagnetic coated electrically nonconductive fibers.

28. A thermoset heating composition as claimed in claim 2, wherein said fibers are selected from the group consisting of: rapidly solidified carbon steel fibers, rapidly solidified magnetic stainless steel fibers and rapidly solidified nickel fibers.

29. A thermoset heating composition as claimed in claim 2, wherein said fibers are selected from the group consisting of: nickel coated electrically conductive fibers, ferrite coated electrically conductive fibers, nickel coated electrically nonconductive fibers and ferrite coated electrically nonconductive fibers.

30. A thermoset heating composition as claimed in claim 2, wherein said fibers are selected from the group consisting of: drawn carbon steel fibers and drawn magnetic stainless steel fibers.

31. A method of thermally processing a thermoset heating composition, said method comprising the steps of:
providing a thermoset heating composition comprising:
a thermal processing agent; and
a thermoset material, said thermal processing agent formed as fibers comprising ferromagnetic material having a magnetic permeability greater than 1 and said thermal processing agent being dispersed in or on, coated upon or otherwise associated with said thermoset material;
placing said thermoset heating composition adjacent to a coil; and
energizing said coil to generate an alternating magnetic field, wherein heat is generated in said thermal processing agent to heat said thermoset heating composition at heating efficiencies greater than 150% of the heating efficiency of a thermal processing agent comprised of 74–420$\mu$ iron powder, in a corresponding alternating magnetic field.

32. A method for thermally processing a thermoset heating composition, as claimed in claim 31 wherein said step of providing a thermoset heating composition comprises the step of providing said thermal processing agent of said thermoset heating composition in the form of fibers in which heat is generated to thermally process said thermoset heating composition at heating efficiencies greater than 200% of the heating efficiency of a thermal processing agent formed as 74–420$\mu$ iron powder in a corresponding alternating magnetic field.

33. A method for thermally processing a thermoset heating composition, as claimed in claim 31 wherein said step of providing a thermoset heating composition comprises the step of providing said thermal processing agent of said thermoset heating composition in the form of fibers in which heat is generated to thermally process said thermoset heating composition at heating efficiencies greater than 600% of the heating efficiency of a thermal processing agent formed as 74–420$\mu$ iron powder in a corresponding alternating magnetic field.

34. A method for thermally processing a thermoset heating composition, as claimed in claim 31 wherein said step of providing a thermoset heating composition comprises the step of providing said thermal processing agent of thermoset heating composition in the form of fibers in which heat is generated to thermally process said thermoset heating compositions at heating efficiencies greater than 1500% of the heating efficiency of a thermal processing agent formed as 74–420$\mu$ iron powder in a corresponding alternating magnetic field.

35. A method for thermally processing a thermoset heating composition, as claimed in claim 32 wherein said step of providing a thermoset heating composition comprises the step of providing said thermal processing agent of said thermoset heating composition in the form of fibers selected from the group consisting of: carbon steel fibers and magnetic stainless steel fibers.

36. A method for thermally processing a thermoset heating composition, as claimed in claim 32 wherein said step of providing a thermoset heating composition comprises the step of providing said thermal processing agent of said thermoset heating composition in the form of fibers selected from the group consisting of: carbon steel wool fibers, magnetic stainless steel wool fibers and nickel wool fibers.

37. A method for thermally processing a thermoset heating composition, as claimed in claim 32 wherein said step of providing a thermoset heating composition comprises the step of providing said thermal processing agent of said thermoset heating composition in the form of fibers with a calculated critical frequency determined by solving the equation fc=1.6×108 p/$\mu$ a2 where p=resistivity at a selected temperature in ° F., $\mu$=permeability, and a =average diameter of the thermal processing agent in inches), above which said fibers will heat efficiently; and said step of energizing said coil to generate an alternating magnetic field comprises the step of energizing said coil to generate a magnetic field alternating at a frequency which is less than 75% of said critical frequency.

38. A method for thermally processing a thermoset heating composition, as claimed in claim 37 wherein said step of energizing said coil comprises energizing said coil to generate a magnetic field alternating at a frequency which is less than 20% of said critical frequency.

39. A method for thermally processing a thermoset heating composition, as claimed in claim 32 wherein said step of providing a thermoset heating composition comprises the step of providing said thermal processing agent of said thermoset heating composition in the form of fibers with computed reference depth d for said ferromagnetic material at a given frequency which reference depth is determined using the equation $$d=3160\sqrt{p/\mu f}$$

where p=resistivity at a selected temperature in ° F., $\mu$=permeability, and f=frequency for said ferromagnetic material at a given frequency; and further comprising the steps of:

calculating an electrical diameter at which said fibers would heat effectively at said frequency as greater than four times said reference depth;

placing said thermoset heating composition comprised of said thermoset material and said thermal processing agent, selected from fibers of an average electrical diameter less than 3.5 times said calculated reference depth, adjacent to a coil; and energizing said coil to generate a magnetic field alternating at said frequency.

40. A method for thermally processing a thermoset heating composition, as claimed in claim 39 further comprising the step of selecting fibers of an average electrical diameter less than 1.0 times said calculated reference depth.

41. A method for thermally processing a thermoset heating composition, as claimed in claim 32 wherein said step of providing a thermoset heating composition comprises the step of providing said thermal processing agent of said thermoset heating composition in the form of fibers having average diameters less than 75% of the average or mid particle size range of particles of 74–420$\mu$ iron powder wherein said mid particle size range is equal to ((420$\mu$–74$\mu$)/2)+74$\mu$=247 $\mu$.

42. A method for thermally processing a thermoset heating composition, as claimed in claim 41 wherein said step of providing a thermoset heating composition comprises the step of providing said thermal processing agent of said thermoset heating composition in the form of fibers having average diameters less than 20% of the average or mid particle size range of particles of 74–420$\mu$ iron powder.

43. A method for thermally processing a thermoset heating composition, as claimed in claim 32 wherein said step of providing a thermoset heating composition further comprises the step of associating said fibers at a given proportion by weight of said thermoset material, required for a given heating rate, wherein said proportion of fibers by weight of said thermoset material is less than 75% of a given proportion of 74–420$\mu$ iron powder by weight of said thermoset material, required for the same or similar heating rate.

44. A method for thermally processing a thermoset heating composition, as claimed in claim 43 wherein said step of providing a thermoset heating composition further comprises the step of associating said fibers at a given proportion by weight of said thermoset material, required for a given heating rate, wherein said proportion of fibers by weight of said thermoset material is less than 50% of a given proportion of 74–420$\mu$ iron powder by weight of said thermoset material, required for the same or similar heating rate.

45. A method for thermally processing a thermoset heating composition, as claimed in claim 43 wherein said step of providing a thermoset heating composition further comprises the step of associating said fibers at a given proportion by weight of said thermoset material, required for a given heating rate, wherein said proportion of fibers by weight of said thermoset material is less than 10% of a given proportion of 74–420$\mu$ iron powder by weight of said thermoset material, required for the same or similar heating rate.

46. A method for thermally processing a thermoset heating composition, as claimed in claim 32 wherein said step of providing a thermoset heating composition comprises the step of providing said thermal processing agent of said thermoset heating composition in the form of fibers wherein said apparent density of said fibers is less than 75% of the apparent density of said 74–420$\mu$ iron powder.

47. A method for thermally processing a thermoset heating composition, as claimed in claim 46 wherein said step of providing a thermoset heating composition comprises the step of providing said thermal processing agent of said thermoset heating composition in the form of fibers wherein said apparent density of said fibers is less than 10% of the apparent density of said 74–420$\mu$ iron powder.

48. A method for thermally processing a thermoset heating composition, as claimed in claim 32 wherein said step of providing a thermoset heating composition comprises the step of providing said thermal processing agent of said thermoset heating composition in the form of fibers selected from the group consisting of: nickel fibers, ferromagnetic coated electrically conductive fibers and ferromagnetic coated electrically nonconductive fibers.

49. A method for thermally processing a thermoset heating composition, as claimed in claim 32 wherein said step of providing a thermoset heating composition comprises the step of providing said thermal processing agent of said thermoset heating composition in the form of fibers selected from the group consisting of: rapidly solidified carbon steel fibers, rapidly solidified magnetic stainless steel fibers and rapidly solidified nickel fibers.

50. A method for thermally processing a thermoset heating composition, as claimed in claim 32 wherein said step of providing a thermoset heating composition comprises the step of providing said thermal processing agent of said thermoset heating composition in the form of fibers selected from the group consisting of: nickel coated electrically conductive fibers, ferrite coated electrically conductive fibers, nickel coated electrically nonconductive fibers and ferrite coated electrically nonconductive fibers.

51. A method for thermally processing a thermoset heating composition, as claimed in claim 32 wherein said step of providing a thermoset heating composition comprises the step of providing said thermal processing agent of said thermoset heating composition in the form of fibers selected from the group consisting of: drawn carbon steel fibers and drawn magnetic stainless steel fibers.

52. A thermoset heating composition as claimed in claim 2 wherein said fibers have lengths selected from the group consisting of continuous lengths, semicontinuous lengths and discontinuous lengths.

53. A thermoset heating composition as claimed in claim 2 wherein said fibers have lengths selected from the group consisting of continuous lengths and semicontinuous lengths.

54. A thermoset heating composition as claimed in claim 2 wherein said fibers have discontinuous lengths.

55. A thermoset heating composition as claimed in claim 52 wherein said fibers take the form of groupings of fibers.

56. A thermoset heating composition as claimed in claim 55 wherein said groupings of fibers have a form selected from the group consisting of a mat, a strip and a strand.

57. A thermoset heating composition as claimed in claim 55 wherein said groupings of fibers have an orientation selected from the group consisting of a unidirectional orientation, an isotropic orientation and a random orientation.

58. A thermoset heating composition as claimed in claim 55 wherein said groupings have a form selected from the group consisting of a woven form, a nonwoven form and an intermingled form.

59. A thermoset heating composition as claimed in claim 52 wherein said fibers are incorporated in said thermoset material.

60. A thermoset heating composition as claimed in claim 53 wherein said fibers are incorporated in said thermoset material.

61. A thermoset heating composition as claimed in claim 54 wherein said fibers are incorporated in said thermoset material.

62. A thermoset heating composition as claimed in claim 59 further comprising at least one thermoset substrate, whereby said thermoset material and said at least one thermoset substrate are thermally processed by said thermally processing agent.

63. A thermoset heating composition as claimed in claim 59 further comprising at least one non-thermoset substrate, whereby said thermoset material and said at least one non-thermoset substrate are thermally processed by said thermally processing agent.

64. A thermoset heating composition as claimed in claim 59 further comprising at least one nonreactive substrate, whereby said thermoset material is thermally processed by said thermal processing agent thereby interacting with said at least one nonreactive substrate.

65. A thermoset heating composition as claimed in claim 52 wherein said fibers are coated by said thermoset material.

66. A thermoset heating composition as claimed in claim 53 wherein said fibers are coated by said thermoset material.

67. A thermoset heating composition as claimed in claim 54 wherein said fibers are coated by said thermoset material.

68. A thermoset heating composition as claimed in claim 52 wherein said fibers are dispersed on said thermoset material.

69. A thermoset heating composition as claimed in claim 53 wherein said fibers are dispersed on said thermoset material.

70. A thermoset heating composition as claimed in claim 54 wherein said fibers are dispersed on said thermoset material.

71. A thermoset heating composition as claimed in claim 68 wherein said fibers are unattached to said thermoset material.

72. A thermoset heating composition as claimed in claim 68 wherein said fibers are transiently attached to said thermoset material.

73. A thermoset heating composition as claimed in claim 68 wherein said fibers are permanently attached to said thermoset material.

74. A thermoset heating composition as claimed in claim 68 wherein said fibers have a substantially even distribution on said thermoset material.

75. A thermoset heating composition as claimed in claim 68 wherein said fibers have a predetermined concentration and distribution on said thermoset material.

76. A thermoset heating composition as claimed in claim 52 further including physical characteristic enhancing means for improving the physical characteristics of said thermoset heating composition.

77. A thermoset heating composition as claimed in claim 76 wherein said physical characteristic enhancing means includes strengthening means for increasing tensile strength, flexural strength, impact strength or a combination thereof.

78. A thermoset heating composition as claimed in claim 77 wherein said strengthening means includes reinforcing fibers.

79. A thermoset heating composition as claimed in claim 78 wherein said reinforcing fibers have lengths selected from the group consisting of continuous lengths, semicontinuous lengths and discontinuous lengths.

80. A thermoset heating composition as claimed in claim 79 wherein said reinforcing fibers take the form of groupings of fibers.

81. A thermoset heating composition as claimed in claim 80 wherein said groupings of reinforcing fibers have a form selected from the group consisting of a mat, a strip and a strand.

82. A thermoset heating composition as claimed in claim 80 wherein said groupings of reinforcing fibers have an orientation selected from the group consisting of a unidirectional orientation, an isotropic orientation and a random orientation.

83. A thermoset heating composition as claimed in claim 80 wherein said groupings of reinforcing fibers have a form selected from the group consisting of a woven form, a nonwoven form and an intermingled form.

84. A thermoset heating composition as claimed in claim 78 wherein said reinforcing fibers include fibers selected from the group consisting of conductive fibers and nonconductive fibers.

85. A thermoset heating composition as claimed in claim 78 wherein said reinforcing fibers include fibers selected from the group consisting of ferromagnetic fibers or fibers with ferromagnetic coatings, whereby they contribute to the heating of said thermoset heating composition in said alternating magnetic field.

86. A thermoset heating composition as claimed in claim 78 wherein said fibers are dispersed on said reinforcing fibers.

87. A thermoset heating composition as claimed in claim 78 wherein said fibers are dispersed between layers of said reinforcing fibers.

88. A thermoset heating composition as claimed in claim 78 wherein said fibers are intermixed with said reinforcing fibers.

89. A thermoset heating composition as claimed in claim 78 wherein said fibers are unattached to said reinforcing fibers.

90. A thermoset heating composition as claimed in claim 78 wherein said fibers are transiently attached to said reinforcing fibers.

91. A thermoset heating composition as claimed in claim 78 wherein said fibers are permanently attached to said reinforcing fibers.

92. A thermoset heating composition as claimed in claim 78 wherein said fibers have a substantially even distribution on or otherwise associated with said reinforcing fibers.

93. A thermoset heating composition as claimed in claim 78 wherein said fibers have a predetermined concentration and distribution on or otherwise associated with said reinforcing fibers.

94. A thermoset heating composition as claimed in claim 76 wherein said physical character enhancing means includes a physical character enhancing means selected from the group consisting of organic and inorganic fillers.

95. A thermoset heating composition as claimed in claim 94 wherein said organic and inorganic fillers are coated with ferromagnetic materials, whereby they contribute to the heating of said thermoset heating composition in said alternating magnetic field.

96. A thermoset heating composition as claimed in claim 76 wherein said physical characteristic enhancing means includes physical characteristic enhancing means selected from the group consisting of flame retardance, smoke retardance, impact resistance, foaming and conductivity.

97. A thermoset heating composition as claimed in claim 52 further including thickness regulation means for regulating the thickness of said thermoset heating composition.

98. A thermoset heating composition as claimed in claim 97 wherein said thickness regulation means is selected from the group consisting of inorganic particles, organic particles, ferromagnetic particles, ferromagnetic coated organic particles and ferromagnetic coated inorganic particles.

99. A thermoset heating composition as claimed in claim 52 wherein said fibers are located in a substrate, said fibers generating heat when exposed to said alternating magnetic field to heat said substrate whereby said heated substrate thermally processes said thermoset material.

100. A thermoset heating composition as claimed in claim 52 wherein said fibers partially thermally process said thermoset material to a predetermined degree thereby allowing said thermoset heating composition to be: incorporated in a subsequent operation and further thermally processed, with or without additional thermoset material, either by the fibers in an alternating magnetic field or by other thermally processing means.

101. A thermoset heating composition as claimed in claim 52 wherein said fibers are incorporated in a cured thermoset heating composition and wherein said fibers heat said cured thermoset heating composition when exposed to said alternating magnetic field, whereby said cured thermoset heating composition further thermally processes a substrate with which it is in thermal contact.

102. A substrate thermally processed by said cured thermoset heating composition as claimed in claim 101 wherein said substrate is a thermoset.

103. A substrate thermally processed by said cured thermoset heating composition as claimed in claim 101 wherein said substrate is a thermoplastic.

104. A substrate thermally processed by said cured thermoset heating composition as claimed in claim 101 wherein said substrate is an adhesive.

105. A thermoset heating composition as claimed in claim 52 wherein said fibers are adjacent to said thermoset material.

106. A thermoset heating composition as claimed in claim 53 wherein said fibers are adjacent to said thermoset material.

107. A thermoset heating composition as claimed in claim 54 wherein said fibers are adjacent to said thermoset material.

108. A thermoset heating composition as claimed in claim 52 wherein said thermoset material is granular.

109. A thermoset heating composition as claimed in claim 53 wherein said thermoset material is granular.

110. A thermoset heating composition as claimed in claim 54 wherein said thermoset material is granular.

111. A thermoset heating composition as claimed in claim 52 wherein said thermoset material is in the form of a liquid or a paste.

112. A thermoset heating composition as claimed in claim 53 wherein said thermoset material is in the form of a liquid or a paste.

113. A thermoset heating composition as claimed in claim 54 wherein said thermoset material is in the form of a liquid or a paste.

114. A method for thermally processing a thermoset heating composition, as claimed in claim 31 wherein said step of providing a thermoset heating composition comprises the step of providing said thermal processing agent of said thermoset heating composition in the form of fibers having lengths selected from the group consisting of continuous lengths, semicontinuous lengths and discontinuous lengths.

115. A method for thermally processing a thermoset heating composition, as claimed in claim 31 wherein said step of providing a thermoset heating composition comprises the step of providing said thermal processing agent of said thermoset heating composition in the form of fibers having lengths selected from the group consisting of continuous lengths and semicontinuous lengths.

116. A method for thermally processing a thermoset heating composition, as claimed in claim 31 wherein said step of providing a thermoset heating composition comprises the step of providing said thermal processing agent of said thermoset heating composition in the form of fibers having discontinuous lengths.

117. A method for thermally processing a thermoset heating composition, as claimed in claim 114 wherein said step of providing a thermoset heating composition comprises the step of providing said thermal processing agent of said thermoset heating composition in the form of groupings of fibers.

118. A method for thermally processing a thermoset heating composition, as claimed in claim 117 wherein said step of providing said thermal processing agent of said thermoset heating composition in the form of groupings of fibers comprises the step of providing said groupings of fibers to have a form selected from the group consisting of a mat, a strip and a strand.

119. A method for thermally processing a thermoset heating composition, as claimed in claim 117 wherein said step of providing said thermal processing agent of said thermoset heating composition in the form of groupings of fibers comprises the step of providing said groupings of fibers to have an orientation selected from the group consisting of a unidirectional orientation, an isotropic orientation and a random orientation.

120. A method for thermally processing a thermoset heating composition, as claimed in claim 117 wherein said step of providing said thermal processing agent of said thermoset heating composition in the form of groupings of fibers comprises the step of providing said groupings of fibers to have a form selected from the group consisting of a woven form, a nonwoven form and an intermingled form.

121. A method for thermally processing a thermoset heating composition, as claimed in claim 114 further comprising the step of incorporating said fibers in said thermoset material.

122. A method for thermally processing a thermoset heating composition, as claimed in claim 115 further comprising the step of incorporating said fibers in said thermoset material.

123. A method for thermally processing a thermoset heating composition, as claimed in claim 116 further comprising the step of incorporating said fibers in said thermoset material.

124. A method for thermally processing a thermoset heating composition, as claimed in claim 121 further comprising the step of associating said thermoset heating composition with at least one thermoset substrate whereby said thermoset heating composition thermally processes said at least one thermoset substrate.

125. A method for thermally processing a thermoset heating composition, as claimed in claim 121 further comprising the step of associating said thermoset heating composition with at least one non-thermoset substrate whereby said thermoset heating composition thermally processes said at least one non-thermoset substrate.

126. A method for thermally processing a thermoset heating composition, as claimed in claim 121 further comprising the steps of:

associating said thermoset heating composition with at least one nonreactive substrate; and thermally processing said thermoset heating composition whereby said thermally processed thermoset heating composition interacts with said at least one nonreactive substrate.

127. A method for thermally processing a thermoset heating composition, as claimed in claim 114 further comprising the step of coating said fibers with said thermoset material.

128. A method for thermally processing a thermoset heating composition, as claimed in claim 115 further comprising the step of coating said fibers with said thermoset material.

129. A method for thermally processing a thermoset heating composition, as claimed in claim 116 further comprising the step of coating said fibers with said thermoset material.

130. A method for thermally processing a thermoset heating composition, as claimed in claim 114 further comprising the step of dispersing said fibers on said thermoset material.

131. A method for thermally processing a thermoset heating composition, as claimed in claim 115 further comprising the step of dispersing said fibers on said thermoset material.

132. A method for thermally processing a thermoset heating composition, as claimed in claim 116 further comprising the step of dispersing said fibers on said thermoset material.

133. A method for thermally processing a thermoset heating composition, as claimed in claim 130 wherein said fibers are unattached to said thermoset material.

134. A method for thermally processing a thermoset heating composition, as claimed in claim 130 further comprising the step of transiently attaching said fibers to said thermoset material.

135. A method for thermally processing a thermoset heating composition, as claimed in claim 130 further comprising the step of permanently attaching said fibers to said thermoset material.

136. A method for thermally processing a thermoset heating composition, as claimed in claim 130 further comprising the step of substantially evenly distributing said fibers on said thermoset material.

137. A method for thermally processing a thermoset heating composition, as claimed in claim 130 further comprising the step of distributing said fibers on said thermoset material in predetermined areas and concentrations.

138. A method for thermally processing a thermoset heating composition, as claimed in claim 114 further comprising the step of providing additives to enhance the physical characteristics of said thermoset heating composition.

139. A method for thermally processing a thermoset heating composition, as claimed in claim 138 wherein said step of providing additives to enhance the physical characteristics of said thermoset heating composition comprises the step of selecting additives to enhance the physical strength of said thermoset heating composition, whereby tensile strength, flexural strength, impact strength or a combination thereof are increased.

140. A method for thermally processing a thermoset heating composition, as claimed in claim 139 further comprising the step of providing said additives in the form of reinforcing fibers.

141. A method for thermally processing a thermoset heating composition, as claimed in claim 140 wherein said step of providing said additives in the form of reinforcing fibers further comprises the step of providing said reinforcing fibers to have lengths selected from the group consisting of continuous lengths, semicontinuous lengths and discontinuous lengths.

142. A method for thermally processing a thermoset heating composition, as claimed in claim 141 wherein said step of providing said additives in the form of reinforcing fibers further comprises the step of providing said reinforcing fibers in the form of groupings of fibers.

143. A method for thermally processing a thermoset heating composition, as claimed in claim 142 wherein said step of providing said reinforcing fibers in the form of groupings of fibers further comprises the step of providing said groupings of fibers to have a form selected from the group consisting of a mat, a strip and a strand.

144. A method for thermally processing a thermoset heating composition, as claimed in claim 142 wherein said step of providing said reinforcing fibers in the form of groupings of fibers further comprises the step of providing said groupings of fibers to have an orientation selected from the group consisting of a unidirectional orientation, an isotropic orientation and a random orientation.

145. A method for thermally processing a thermoset heating composition, as claimed in claim 142 wherein said step of providing said reinforcing fibers in the form of groupings of fibers further comprises the step of providing said groupings of fibers to have a form selected from the group consisting of a woven form, a nonwoven form and an intermingled form.

146. A method for thermally processing a thermoset heating composition, as claimed in claim 140 wherein said step of providing said reinforcing fibers further comprises the step of providing said reinforcing fibers including fibers selected from the group of conductive and nonconductive fibers.

147. A method for thermally processing a thermoset heating composition, as claimed in claim 140 wherein said step of providing said reinforcing fibers further comprises the step of providing said reinforcing fibers including fibers selected from the group of ferromagnetic and ferromagnetic coated fibers, whereby they contribute to the heating of said thermoset heating composition in said alternating magnetic field.

148. A method for thermally processing a thermoset heating composition, as claimed in claim 140 further comprising the step of dispersing said fibers on said reinforcing fibers.

149. A method for thermally processing a thermoset heating composition, as claimed in claim 140 further comprising the step of dispersing said fibers between layers of said reinforcing fibers.

150. A method for thermally processing a thermoset heating composition, as claimed in claim 140 further comprising the step of intermixing said fibers with said reinforcing fibers.

151. A method for thermally processing a thermoset heating composition, as claimed in claim 140 wherein said fibers are unattached to said reinforcing fibers.

152. A method for thermally processing a thermoset heating composition, as claimed in claim 140 wherein said fibers are transiently attached to said reinforcing fibers.

153. A method for thermally processing a thermoset heating composition, as claimed in claim 140 wherein said fibers are permanently attached to said reinforcing fibers.

154. A method for thermally processing a thermoset heating composition, as claimed in claim 140 further comprising the step of distributing said fibers substantially evenly on or otherwise associated with said reinforcing fibers.

155. A method for thermally processing a thermoset heating composition, as claimed in claim 140 further comprising the step of distributing said fibers in a predetermined concentration and distribution on or otherwise associated with said reinforcing fibers.

156. A method for thermally processing a thermoset heating composition, as claimed in claim 138 further comprising the step of providing said additives selected from the group of organic fillers and inorganic fillers.

157. A method for thermally processing a thermoset heating composition, as claimed in claim 156 wherein said organic fillers and inorganic fillers are coated with ferromagnetic materials, whereby they contribute to the heating of said thermoset heating composition in said alternating magnetic field.

158. A method for thermally processing a thermoset heating composition, as claimed in claim 138 wherein said step of providing additives to enhance the physical characteristics of said thermoset heating composition further comprises the step of selecting additives to enhance a physical characteristic selected from the group consisting of flame retardance, smoke retardance, impact resistance, foaming and conductivity.

159. A method for thermally processing a thermoset heating composition, as claimed in claim 138 further comprising the step of providing a thickness regulation means for regulating the thickness of said thermoset heating composition.

160. A method for thermally processing a thermoset heating composition, as claimed in claim 159 wherein said thickness regulation means are selected from the group consisting of inorganic particles, organic particles, ferromagnetic particles, ferromagnetic coated organic particles and ferromagnetic coated inorganic.

161. A method for thermally processing a thermoset heating composition, as claimed in claim 114 further comprising the steps of:

incorporating said fibers in a substrate;

exposing said fibers in said substrate to an alternating magnetic field, thereby generating heat in said substrate; and placing a thermoset material in thermal contact with said heated substrate to thermally process said thermoset material.

162. A method for thermally processing a thermoset heating composition, as claimed in claim 114 further comprising the steps of:

limiting the thermal processing of said thermoset material to a predetermined degree resulting in a partially processed thermoset composition;

incorporating said partially processed thermoset composition in subsequent a operation; and thermally processing said partially processed thermoset composition, with or without additional thermoset material, in an alternating magnetic field or by other thermal processing means.

163. A method for thermally processing a thermoset heating composition, as claimed in claim 114 further comprising the steps of:

incorporating said fibers in a cured thermoset heating composition;

exposing said fibers in said cured thermoset heating composition to an alternating magnetic field to generate heat in said cured thermoset heating composition; and placing said heated cured thermoset heating composition in thermal contact with a substrate to thermally process said substrate.

164. A method for thermally processing a thermoset heating composition, as claimed in claim 163 in which said substrate is a thermoset material.

165. A method for thermally processing a thermoset heating composition, as claimed in claim 163 in which said substrate is a thermoplastic material.

166. A method for thermally processing a thermoset heating composition, as claimed in claim 163 in which said substrate is an adhesive material.

167. A method for thermally processing a thermoset heating composition, as claimed in claim 114 further comprising the step of locating said fibers adjacent to said thermoset material.

168. A method for thermally processing a thermoset heating composition, as claimed in claim 115 further comprising the step of locating said fibers adjacent to said thermoset material.

169. A method for thermally processing a thermoset heating composition, as claimed in claim 116 further comprising the step of locating said fibers adjacent to said thermoset material.

170. A method for thermally processing a thermoset heating composition, as claimed in claim 114 further comprising the step of providing said thermoset material in granular form.

171. A method for thermally processing a thermoset heating composition, as claimed in claim 115 further comprising the step of providing said thermoset material in granular form.

172. A method for thermally processing a thermoset heating composition as claimed in claim 116 further comprising the step of providing said thermoset material in granular form.

173. A method for thermally processing a thermoset heating composition as claimed in claim 114 further comprising the step of providing said thermoset material in liquid or paste form.

174. A method for thermally processing a thermoset heating composition as claimed in claim 115 further comprising the step of providing said thermoset material in liquid or paste form.

175. A method for thermally processing a thermoset heating composition as claimed in claim 116 further comprising the step of providing said thermoset material in liquid or paste form.

\* \* \* \* \*